United States Patent
Philbrook et al.

(10) Patent No.: US 11,247,168 B2
(45) Date of Patent: Feb. 15, 2022

(54) GAS PURIFICATION USING A CO-AXIAL CO-CURRENT CONTACTOR

(71) Applicant: ExxonMobil Upstream Research Company, Spring, TX (US)

(72) Inventors: Sean T. Philbrook, Houston, TX (US); Shwetha Ramkumar, Cypress, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 39 days.

(21) Appl. No.: 16/944,437

(22) Filed: Jul. 31, 2020

(65) Prior Publication Data

US 2021/0069638 A1  Mar. 11, 2021

Related U.S. Application Data

(60) Provisional application No. 62/898,215, filed on Sep. 10, 2019.

(51) Int. Cl.
 *B01D 53/14* (2006.01)
 *B01D 53/18* (2006.01)
 (Continued)

(52) U.S. Cl.
 CPC ....... *B01D 53/185* (2013.01); *B01D 53/1406* (2013.01); *B01D 53/1425* (2013.01); *B01D 53/1462* (2013.01); *B01D 53/18* (2013.01); *B01D 53/526* (2013.01); *B01D 53/78* (2013.01); *B01D 2252/2023* (2013.01);
 (Continued)

(58) Field of Classification Search
 CPC .. B01D 2252/2023; B01D 2252/20421; B01D 2252/20426; B01D 2252/20431; B01D 2259/124; B01D 53/1406; B01D 53/1425; B01D 53/1462; B01D 53/1468; B01D 53/1475; B01D 53/18;
 (Continued)

(56) References Cited

U.S. PATENT DOCUMENTS

| 4,073,832 A | 2/1978 | McGann |
| 2009/0165878 A1 | 7/2009 | Krakowski et al. |

(Continued)

FOREIGN PATENT DOCUMENTS

WO  WO2009/140993  11/2009

*Primary Examiner* — Cabrena Holecek
(74) *Attorney, Agent, or Firm* — ExxonMobil Upstream Research Company—Law Department

(57) ABSTRACT

A co-axial co-current contactor (CA-CCC) is described herein. The CA-CCC includes an outer annular support ring and an inner annular support ring configured to maintain the CA-CCC within an outer pipe and an inner pipe, respectively. The CA-CCC includes rich liquid flow channels located between the outer annular support ring and the inner annular support ring that are configured to allow a rich liquid stream to flow through the CA-CCC, and a central gas entry cone and gas flow channels configured to allow a gas stream to flow through the CA-CCC. The CA-CCC further includes radial blades configured to secure the central gas entry cone to the inner annular support ring and allow a lean liquid stream to flow into the central gas entry cone and the gas flow channels. The CA-CCC provides for efficient incorporation of liquid droplets formed from the lean liquid stream into the gas stream.

12 Claims, 17 Drawing Sheets

(51) Int. Cl.
*B01D 53/52* (2006.01)
*B01D 53/78* (2006.01)

(52) U.S. Cl.
CPC .............. *B01D 2252/20421* (2013.01); *B01D 2252/20426* (2013.01); *B01D 2252/20431* (2013.01); *B01D 2259/124* (2013.01)

(58) Field of Classification Search
CPC .... B01D 53/185; B01D 53/526; B01D 53/78; B01F 3/04049; Y02C 20/40
See application file for complete search history.

(56) References Cited

U.S. PATENT DOCUMENTS

| | | | |
|---|---|---|---|
| 2014/0331862 A1* | 11/2014 | Cullinane | ............... B01F 5/045 95/186 |
| 2016/0199774 A1* | 7/2016 | Grave | .................... C10L 3/104 95/223 |
| 2018/0361309 A1 | 12/2018 | Yeh et al. | |

* cited by examiner

300

500

500

500

GAS PURIFICATION USING A CO-AXIAL CO-CURRENT CONTACTOR

CROSS REFERENCE TO RELATED APPLICATIONS

This application claims the priority benefit of U.S. Provisional Patent Application No. 62/898,215, filed Sep. 10, 2019, entitled GAS PURIFICATION USING A CO-AXIAL CO-CURRENT CONTACTOR.

FIELD

The present techniques provide for the purification of a gas stream using a co-axial co-current contactor. More specifically, the present techniques provide for the removal of impurities from a gas stream using a co-axial co-current contactor within a gas processing system.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ or $CO_2$ are produced as part of a hydrocarbon gas stream, the raw gas stream is sometimes referred to as "sour gas." The $H_2S$ and $CO_2$ are often referred to together as "acid gases."

In addition to hydrocarbon production streams, acid gases may be associated with synthesis gas streams, or with refinery gas streams. Acid gases may also be present within so-called flash-gas streams in gas processing facilities. Further, acid gases may be generated by the combustion of coal, natural gas, or other carbonaceous fuels.

Natural gas streams may contain not only $H_2S$ and $CO_2$, but may also contain other "acidic" impurities. These include mercaptans and other trace sulfur compounds ($SO_x$). In addition, natural gas streams may contain water. Indeed, water is the most common contaminant in many natural gas streams.

Such impurities are often removed prior to industrial or residential use. For example, natural gas streams are typically purified to concentrations of less than 4 parts per million (ppm) $H_2S$ and less than 2 volume % (vol. %) $CO_2$ prior to sale.

Processes have been devised to remove contaminants from a raw natural gas stream. In the case of acid gases, cryogenic gas processing is sometimes used, particularly to remove $CO_2$ to prevent line freezing and plugged orifices. In other instances, particularly with $H_2S$ removal, the raw natural gas stream is treated with a solvent. Solvents may include chemical solvents such as amines. Examples of amines used in sour gas treatment include monoethanol amine (MEA), diethanol amine (DEA), and methyl diethanol amine (MDEA).

Physical solvents are sometimes used in lieu of chemical solvents. Examples include SELEXOL™ (available from Dow Chemical Company) and RECTISOL® (available from The Linde Group). However, chemical solvents are generally more effective than physical solvents, particularly at feed gas pressures below about 300 psia (2.07 MPa). In some instances, hybrid solvents, meaning mixtures of physical and chemical solvents, have been used. An example is Sulfinol®.

As a result of the gas sweetening process, a treated, or "sweetened," gas stream is created. The sweetened gas stream is substantially depleted of $H_2S$ and/or $CO_2$ components. The sweetened gas stream can be further processed for liquids recovery, that is, by condensing out heavier hydrocarbon gases. The sweetened gas stream may be sold into a pipeline or may be used for liquefied natural gas (LNG) feed if the $CO_2$ concentration is less than, for example, about 50 ppm. In addition, the sweetened gas stream may be used as feedstock for a gas-to-liquids process, and then ultimately used to make waxes, butanes, lubricants, glycols, or other petroleum-based products. The extracted $CO_2$ may be sold, or it may be injected into a subterranean reservoir for enhanced oil recovery (EOR) operations.

When a natural gas stream contains water, a dehydration process is usually undertaken before acid gas removal. This is done through the use of glycol or other desiccant in a water separator. The dehydration of natural gas is performed to control the formation of gas hydrates and to prevent corrosion in distribution pipelines. The formation of gas hydrates and corrosion in pipelines can cause a decrease in flow volume as well as frozen control valves, plugged orifices, and other operating problems.

Traditionally, the removal of acid gases or water using chemical solvents or desiccants involves contacting the raw natural gas stream in a counter-current flow with the absorbent chemical. The raw gas stream is introduced into the bottom section of a contacting tower. At the same time, the solvent solution is directed into the top section of the tower. The tower has trays, packing, or other "internals." As the liquid solvent cascades through the internals, it absorbs the undesirable components, carrying them away through the bottom of the contacting tower as part of a "rich" solvent solution. At the same time, gaseous fluid that is largely depleted of the undesirable components exits at the top of the tower.

The rich solvent or rich glycol that exits the contactor is sometimes referred to as an absorbent liquid. Following absorption, a process of regeneration (also called "desorption") may be employed to separate contaminants from the active solvent of the absorbent liquid. This produces a "lean" solvent or a "lean" glycol that is then typically recycled into the contacting tower for further absorption.

Known counter-current contactors used for dehydration or for $H_2S$ and $CO_2$ absorption tend to be very large and heavy. This creates particular difficulty in offshore oil and gas production applications where smaller equipment is desirable. Further, the transport and set-up of large tower-based facilities is difficult for shale gas production operations that frequently take place in remote locations.

SUMMARY

An exemplary embodiment provides a co-axial co-current contactor (CA-CCC), including an outer annular support ring configured to maintain the CA-CCC within an outer pipe and an inner annular support ring configured to maintain the CA-CCC within an inner pipe. The CA-CCC includes a number of rich liquid flow channels located between the outer annular support ring and the inner annular support ring that are configured to allow a rich liquid stream to flow through the CA-CCC. The CA-CCC also includes a central gas entry cone and a number of gas flow channels configured to allow a gas stream to flow through the CA-CCC. The CA-CCC further includes a number of radial blades configured to secure the central gas entry cone to the inner annular support ring and allow a lean liquid stream to flow into the central gas entry cone and the number of gas flow channels. The CA-CCC provides for efficient incorporation of liquid droplets formed from the lean liquid stream into the gas stream.

Another exemplary embodiment provides a method for purifying a gas stream. The method includes co-currently flowing a lean liquid stream and a gas stream including impurities into an inner portion of a CA-CCC residing within an inner pipe, and flowing a rich liquid stream through an outer portion of the CA-CCC residing between the inner pipe and an outer pipe. The method also includes contacting liquid droplets formed from the lean liquid stream with the gas stream within the inner portion of the CA-CCC, such that the impurities from the gas stream are absorbed by the liquid droplets. The method further includes allowing the liquid droplets including the impurities to combine with the rich liquid stream within the outer pipe.

Another exemplary embodiment provides a co-axial co-current contacting system (CA-CCCS), including an inner pipe and an outer pipe, and a swirl element secured within the outer pipe. The swirl element is configured to cause a rich liquid stream to flow along a wall of the outer pipe and a gas stream including impurities to flow into an anti-swirl element secured within the inner pipe. The anti-swirl element is configured to straighten a flow of the gas stream. The CA-CCCS also includes a CA-CCC, including an inner portion residing within the inner pipe and an outer portion residing between the inner pipe and the outer pipe. The CA-CCC is configured to allow the rich liquid stream to flow through the outer portion, allow a lean liquid stream and the gas stream to flow through the inner portion, and contact liquid droplets formed from the lean liquid stream with the gas stream within the inner portion, such that the impurities from the gas stream are absorbed by the liquid droplets.

Another exemplary embodiment provides a gas purification system. The gas purification system includes a co-current contactor configured to co-currently flow a gas stream including impurities and a first liquid stream through the co-current contactor. The co-current contactor is also configured to incorporate first liquid droplets formed from the first liquid stream into the gas stream, such that a first portion of the impurities from the gas stream are absorbed by the first liquid droplets. The gas purification system also includes a CA-CCCS. The CA-CCCS includes an inner pipe and an outer pipe, and a swirl element secured within the outer pipe. The swirl element is configured to cause the first liquid droplets to flow along a wall of the outer pipe and the gas stream to flow into an anti-swirl element secured within the inner pipe. The anti-swirl element is configured to straighten a flow of the gas stream. The CA-CCCS also includes a CA-CCC, including an inner portion residing within the inner pipe and an outer portion residing between the inner pipe and the outer pipe. The CA-CCC is configured to allow the first liquid droplets to flow through the outer portion and allow a second liquid stream and the gas stream to flow through the inner portion. The CA-CCC is also configured to contact second liquid droplets formed from the second liquid stream with the gas stream within the inner portion, such that a second portion of the impurities from the gas stream are absorbed by the second liquid droplets.

DESCRIPTION OF THE DRAWINGS

The advantages of the present techniques are better understood by referring to the following detailed description and the attached drawings, in which.

DETAILED DESCRIPTION

Figure 1:
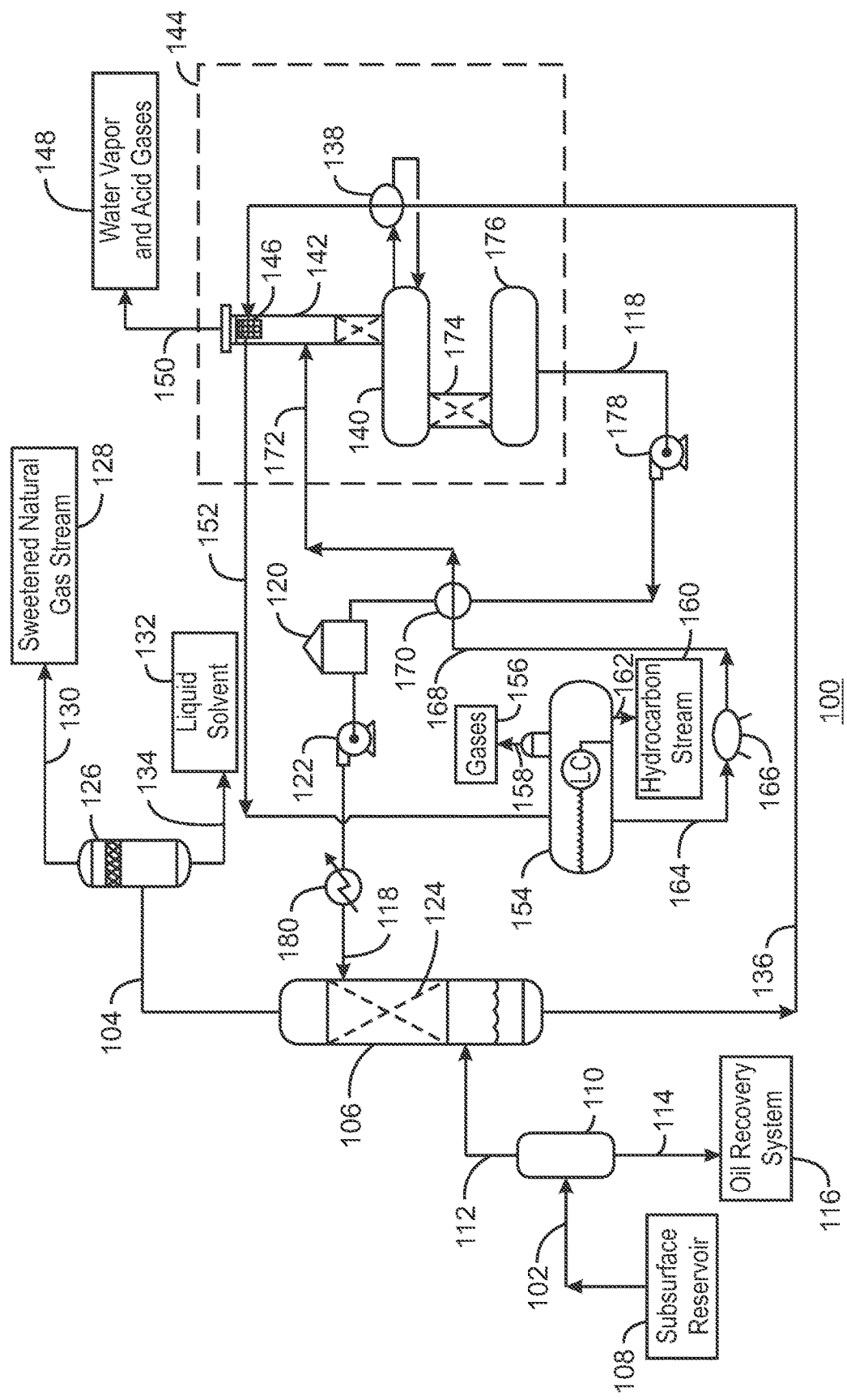
FIG. 1 is a process flow diagram of a conventional gas processing facility.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Acid gas" refers to any gas that dissolves in water, producing an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

"Co-current contacting device" or "co-current contactor" refers to a vessel that receives a stream of gas and a separate stream of gas treating solution, or solvent, in such a manner that the gas stream and the solvent stream contact one another while flowing in generally the same directions within the contactor.

The term "co-currently" refers to the internal arrangement of process streams within a unit operation that can be divided into several sub-sections by which the process streams flow in the same direction.

As used herein, a "column" is a separation vessel in which a counter-current flow is used to isolate materials on the basis of differing properties. In an absorbent column, a physical solvent is injected into the top, while a mixture of gases to be separated is flowed through the bottom. As the gases flow upwards through the falling stream of absorbent, one gas species is preferentially absorbed, lowering its concentration in the vapor stream exiting the top of the column. A portion of the overhead vapor may be condensed and pumped back into the top of the column as a reflux stream, which can be used to enhance the separation and purity of the overhead product. A bulk liquid stripper is related to a fractionation column. However, the bulk liquid stripper functions without the use of a reflux stream and, thus, cannot produce a high-purity overhead product.

In a distillation column, a gas stream may be separated into multiple components based on boiling point or vapor pressure differences. The high vapor pressure, or lower boiling point, components will tend to concentrate in the vapor phase, whereas the low vapor pressure, or higher boiling point, components will tend to concentrate in the liquid phase. Cryogenic separation is a separation process carried out in a column at least in part at temperatures at or below 150 degrees Kelvin (K). To enhance the separation, both types of columns may use a series of vertically spaced trays or plates mounted within the column and/or packing elements such as structured or random packing. Columns may often have a recirculated stream at the base to provide heat energy for boiling the fluids, called reboiling.

The term "dehydrated natural gas stream" refers to a natural gas stream that has undergone a dehydration process. Typically, the dehydrated natural gas stream has a water content of less than 50 ppm, and preferably less than 7 ppm. Any suitable process for dehydrating the natural gas stream can be used. Typical examples of suitable dehydration processes include, but are not limited to, treatment of the natural gas stream with molecular sieves or dehydration using glycol or methanol.

As used herein, the term "dehydration" refers to the pre-treatment of a raw feed gas stream to partially or completely remove water and, optionally, some heavy hydrocarbons. This can be accomplished by means of a pre-cooling cycle, against an external cooling loop or a cold internal process stream, for example. Water may also be removed by means of pre-treatment with molecular sieves, e.g. zeolites, or silica gel or alumina oxide or other drying agents. Water may also be removed by means of washing with glycol, monoethylene glycol (MEG), diethylene glycol (DEG) or triethylene glycol (TEG), or glycerol. The amount of water in the gas feed stream is suitably less than 1 vol. %, preferably less than 0.1 vol. %, more preferably less than 0.01 vol. %.

The term "distillation," or "fractionation," refers to the process of physically separating chemical components into a vapor phase and a liquid phase based on differences in the components' boiling points and vapor pressures at specified temperatures and pressures. Distillation is typically performed in a "distillation column," which includes a series of vertically spaced plates. A feed stream enters the distillation column at a mid-point, dividing the distillation column into two sections. The top section may be referred to as the rectification section, and the bottom section may be referred to as the stripping section. Condensation and vaporization occur on each plate, causing lower boiling point components to rise to the top of the distillation column and higher boiling point components to fall to the bottom. A re-boiler is located at the base of the distillation column to add thermal energy. The "bottoms" product is removed from the base of the distillation column. A condenser is located at the top of the distillation column to condense the product emanating from the top of the distillation column, which is called the distillate. A reflux pump is used to maintain flow in the rectification section of the distillation column by pumping a portion of the distillate back into the distillation column.

As used herein, the term "fluid" refers to gases, liquids, and combinations of gases and liquids, as well as to combinations of gases and solids, and combinations of liquids and solids.

The term "flue gas" refers to any gas stream generated as a by-product of hydrocarbon combustion.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

As used herein, the phrase "gas stream" is understood to mean a fluid stream including light hydrocarbons, e.g., methane, and/or heavy hydrocarbons, e.g., ethane, as received from any suitable type of hydrocarbon recovery operation, e.g., from a reservoir. The gas stream may be a raw natural gas stream including a non-absorbing gas, such as methane, and a contaminant, e.g., acid gas, dissolved or entrained in the raw natural gas stream. While a gas stream is discussed herein with respect to this disclosure, those of skill in the art will appreciate that generally the same principles may be applied to any fluid stream, including with respect to liquid-liquid contacting. Consequently, use of the phrases "gas stream," "gas inlet," "gas outlet," etc., are to be understood as non-limiting and may optionally be replaced with "fluid stream," "fluid inlet," "fluid outlet," and so forth in various embodiments within the scope of this disclosure. Use of the phrases "gas stream," "gas inlet," "gas outlet," etc., are for the sake of convenience only.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_2$, $C_2H_4$, $C_2H_6$, $C_3$ isomers, $C_4$ isomers, benzene, and the like.

As used herein with respect to fluid processing equipment, the term "in-line" means that two or more components of a fluid mixing and separating device are connected sequentially with an identifiable common axis of orientation of flow or, more preferably, are integrated into a single tubular device with an identifiable common axis of orientation of flow.

As used herein with respect to fluid processing equipment, the term "in series" means that two or more devices are placed along a flow line such that a fluid stream undergoing fluid separation moves from one item of equipment to the next while maintaining flow in a substantially constant downstream direction. Similarly, the term "in line" means that two or more components of a fluid mixing and separating device are connected sequentially or, more preferably, are integrated into a single tubular device.

The term "liquid solvent" refers to a fluid in substantially liquid phase that preferentially absorbs one component over another. For example, a liquid solvent may preferentially absorb an acid gas, thereby removing or "scrubbing" at least a portion of the acid gas component from a gas stream or a water stream. Moreover, a liquid solvent may preferentially absorb one acid gas over another.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), acid gases (e.g., carbon dioxide or hydrogen sulfide), or any combinations thereof. The natural gas can also contain minor amounts of contaminants such as water, nitrogen, iron sulfide, wax, crude oil, or any combinations thereof. The natural gas stream may be substantially purified prior to use in embodiments described herein, so as to remove compounds that may act as poisons.

"Non-absorbing gas" means a gas that is not significantly absorbed by a solvent during a gas treating or conditioning process.

As used herein, "purification" includes separation processes by which impurities that may cause problems to downstream processes may be removed. The separation processes may include any number of processes known in the art, such as dehydration, distillation, controlled oxidation of impurities, cold box separation, cryogenic separations, and the like.

"Solvent" refers to a substance capable at least in part of dissolving or dispersing other substances, such as to provide or form a solution. The solvent may be polar, nonpolar, neutral, protic, aprotic, or the like. The solvent may include any suitable element, molecule, or compound, such as methanol, ethanol, propanol, glycols, ethers, ketones, other alcohols, amines, salt solutions, or the like. The solvent may include physical solvents, chemical solvents, or the like. The solvent may operate by any suitable mechanism, such as physical absorption, chemical absorption, chemisorption, physisorption, adsorption, pressure swing adsorption, temperature swing adsorption, or the like. Specific solvents that are useful for acid gas absorption include, but are not limited to, monoethanolamine (MEA), 2(2-aminoethoxy) ethanol [Diglycolamine® (DGA)], diethanolamine (DEA), diisopropanolamine (DIPA), methyldiethanolamine (MDEA), triethyleneamine, FLEXSORB® SE, 2-amino-2methyl-1-propanol (AMP), or formulated amines such as FLEXSORB® SE PLUS, the UCARSOL™ family of products, or formulated MDEA solutions.

The term "sweetened natural gas stream" refers to a natural gas stream that has had at least a portion of acid gas components removed.

As used herein, the terms "a" and "an" mean one or more when applied to any embodiment described herein. The use of "a" and "an" does not limit the meaning to a single feature unless such a limit is specifically stated.

As used herein, the term "about" means±10% of the subsequent number, unless otherwise stated.

The terms "approximate," "approximately," "substantial," and "substantially" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

Overview

The present techniques provide for the removal of impurities from a gas stream using a co-axial co-current contactor within a gas processing system. The gas stream may be a natural gas stream, and the impurities may include acid gases or water, for example. The gas processing system may use a gas treating solution to remove the impurities from the gas stream. The gas treating solution may be any liquid that is capable of absorbing the impurities within the gas stream. For example, if the impurities include acid gases, such as $H_2S$ and $CO_2$, the gas treating solution may be an amine-based solvent that is capable of absorbing the acid gases within the natural gas stream. As another example, if the impurities include water, the gas treating solution may be a desiccant, such as a liquid glycol.

In various embodiments, the gas processing system includes any number of co-current contactors and co-axial co-current contactors connected in series. The co-current contactors and co-axial co-current contactors remove impurities from the gas stream by injecting liquid droplets formed from the gas treating solution into the gas stream such that impurities from the gas stream incorporate into the liquid droplets. In addition, the co-axial co-current contactor includes a pipe-within-a-pipe (or "two pipe") configuration that provides for the separation of the gas stream from the liquid droplets including the impurities. Therefore, the co-axial co-current contactor may replace heavier separation systems that are included within co-current contacting systems, as discussed further with respect to FIGS. 3A and 3B.

Gas Processing Systems

FIG. 1 is a process flow diagram of a conventional gas processing facility 100. The gas processing facility 100 may be used to remove acid gases, such as $H_2S$ and $CO_2$, from a sour natural gas stream 102, generating a sweetened natural gas stream 104. This may be accomplished by flowing a sour natural gas stream 102 into a contactor 106, which may remove the acid gases from the sour natural gas stream 102. The sweetened natural gas stream 104 may then be flowed out of the contactor 106 as an overhead stream. In addition, residual water and acid gas components may be removed in connection with a subsequent process, as discussed further herein.

The sour natural gas stream 102 may be a raw natural gas stream obtained from a subsurface reservoir 108 via any suitable type of hydrocarbon recovery operation. The sour natural gas stream 102 may include a non-absorbing gas, such as methane. The sour natural gas stream 102 may include about 1 to about 10% $H_2S$ and about 1 to about 10% $CO_2$, along with the hydrocarbon gas. In addition, the sour natural gas stream 102 may include other impurities, such as water.

As shown in FIG. 1, the sour natural gas stream 102 may be flowed into an inlet separator 110 upon entry into the gas processing facility 100. When entering the inlet separator 110, the sour natural gas stream 102 may be under a large amount of pressure. However, the pressure of the sour natural gas stream 102 may vary considerably, depending on the characteristics of the subsurface reservoir 108 from which the gas product is produced. For example, the pressure of the sour natural gas stream 102 may range between atmospheric pressure and several thousand psig. For natural gas treating applications, the pressure of the sour natural gas stream 102 may be boosted to about 100 psig, or about 500 psig, or greater, if desired.

The inlet separator 110 may clean the sour natural gas stream 102, for example, to prevent foaming of liquid solvent during the acid gas treatment process. This may be accomplished by separating the sour natural gas stream 102 into liquid-phase components and gas-phase components. The liquid-phase components may include heavy hydrocarbons, water, and impurities such as brine and drilling fluids. Such components may be flowed out of the inlet separator 110 via a bottoms line 114, and may be sent to an oil recovery system 116. The gas-phase components may include natural gas and some amount of impurities, such as acid gases and water. Such components may be flowed out of the inlet separator 110 as the overhead natural gas stream 112.

From the inlet separator 110, the natural gas stream 112 may be flowed into the contactor 106. The contactor 106 may use a liquid solvent stream 118 to absorb acid gases in the natural gas stream 112. The liquid solvent stream 118 may be a chemical solvent, such as a primary amine, a secondary amine, or a tertiary amine. More specifically, the liquid solvent stream 118 may be any solvent that is useful for acid gas absorption.

The liquid solvent stream 118 may be stored in a tank 120. A pump 122 may force the liquid solvent stream 118 from the tank 120 into the contactor 106 under suitable pressure. For example, the pump 122 may boost the pressure of the liquid solvent stream 118 to about 1,000 psig or higher, depending on the pressure of the sour natural gas stream 102.

Once inside the contactor 106, gas within the natural gas stream 112 moves upward through the contactor 106. Typically, trays 124, or other internal structures, are provided within the contactor 106 to create indirect flow paths for the natural gas stream 112 and to create interfacial area between the gas and liquid phases. At the same time, the liquid from the liquid solvent stream 118 moves downward and across the succession of trays 124 in the contactor 106. The trays 124 aid in the interaction of the natural gas stream 112 with the liquid solvent stream 118.

The contactor 106 operates on the basis of a countercurrent flow scheme. In other words, the natural gas stream 112 is directed through the contactor 106 in one direction, while the liquid solvent stream 118 is directed through the contactor 106 in the opposite direction. As the two fluid materials interact, the down-flowing liquid solvent stream 118 absorbs acid gases from the up-flowing natural gas stream 112 to produce the sweetened natural gas stream 104.

Upon exiting the contactor 106, the sweetened natural gas stream 104 can be flowed through an outlet separator 126. The outlet separator 126, also referred to as a scrubber, may allow any liquid solvent carried over from the contactor 106 to fall out of the sweetened natural gas stream 104. The outlet separator 126 may also be used as a water wash vessel to capture vapor-phase solvent. A final sweetened natural gas stream 128 may be flowed out of the outlet separator 126 via an overhead line 130. Any residual liquid solvent 132 may drop out through a bottoms line 134.

A spent solvent stream 136 flows from the bottom of the contactor 106. The spent solvent stream 136 may be a solvent solution that is rich in the absorbed acid gases. The spent solvent stream 136 may be at a relatively high temperature, such as about 90° F. to about 102° F., or higher. In various embodiments, the gas processing facility 100 includes equipment for regenerating the liquid solvent stream 118 from the spent solvent stream 136, as discussed further herein.

From the contactor 106, the spent solvent stream 136 may be flowed through a heat exchanger 138. Within the heat exchanger 138, the spent solvent stream 136 may be cooled, providing heat to a reboiler 140 that is coupled to a distillation column 142 within a regenerator 144. The regenerator 144 may be used to regenerate the liquid solvent stream 118 from the spent solvent stream 136. The regenerator 144 may be a large pressure vessel, or interconnected series of pressure vessels, that operates at about 15 psig to about 25 psig, for example.

The spent solvent stream 136 can be flowed through a tube bundle 146 in the top of the distillation column 142. High-temperature water vapor and acid gases 148 being released from the distillation column 142 may preheat the spent solvent stream 136 as it flows through the tube bundle 146, before the water vapor and acid gases 148 are released via an overhead line 150.

After being preheated within the distillation column 142, the spent solvent stream 136 may be released from the tube bundle 146 as a warmed solvent stream 152. The warmed solvent stream 152 may be flowed into a flash drum 154. The flash drum 154 may operate at a pressure of about 50 psig to 100 psig, for example. The flash drum 154 may have internal parts that create a mixing effect or a tortuous flow path for the solvent stream 152.

Residual gases 156, such as acid gases and methane, may be flashed out of the flash drum 154 via an overhead line 158. The residual gases 156 captured in the overhead line 158 may be reduced to an acid gas content of about 100 ppm if contacted with an amine-based solvent. This concentration of acid gases is small enough that the residual gases 156 can be used as fuel gas for the gas processing facility 100.

In addition, any entrained heavier hydrocarbons, such as ethane or propane, within the solvent stream 152 may be captured within the flash drum 154. The resulting hydrocarbon stream 160 may be flowed out of the flash drum 154 via a bottoms line 162.

Further, as the temperature and pressure of the solvent stream 152 drops within the flash drum 154, the hydrocarbons within the solvent stream 152 are separated out, producing a partially-purified solvent stream 164. The partially-purified solvent stream 164 may then be released from the flash drum 154. The partially-purified solvent stream 164 may be flowed through a filter 166, such as a carbon filter, for particle filtration.

The resulting filtered solvent stream 168 may then be flowed through a heat exchanger 170. Within the heat exchanger 170, the filtered solvent stream 168 may be heated via heat exchange with the liquid solvent stream 118. The resulting high-temperature solvent stream 172 may be flowed into the distillation column 142 of the regenerator 144. As the high-temperature solvent stream 172 travels through the distillation column 142, water vapor and acid gases 148, such as $H_2S$ and $CO_2$, may be removed from the high-temperature solvent stream 172.

The high-temperature solvent stream 172 may be flowed out of the bottom of the distillation column 142 and into the reboiler 140. The reboiler 140 may increase the temperature of the solvent stream 172 using the heat generated by the heat exchanger 138. In addition, the reboiler 140 may boil off residual water vapor and acid gases 148 from the high-temperature solvent stream 172. The components that are boiled off may travel upward through the distillation column 142 and become the water vapor and acid gases 148 in the overhead line 150.

The regenerator 144 may also include a separate stripping section 174 fed from the liquid pool in the reboiler 140. The stripping section 174 may include packing that promotes further distillation. Any remaining impurities, such as water, $H_2S$, or $CO_2$, boil off and join the water vapor and acid gases 148 in the overhead line 150. The solvent stream 172 may then be flowed into a surge tank 176, from which it may be released as the liquid solvent stream 118.

The regenerated liquid solvent stream 118 may be pumped out of the surge tank 176 via a pump 178. The pump 178 may increase the pressure of the liquid solvent stream 118 to about 1,500 psig or about 2,500 psig, for example.

The liquid solvent stream 118 is then flowed through the heat exchanger 170. Heat exchanged with the filtered solvent stream 168 in the heat exchanger 170 may serve to partially cool the liquid solvent stream 118. In addition, the liquid solvent stream 118 may be flowed through a cooler 180 prior to being returned to the contactor 106. The cooler 180 may cool the liquid solvent stream 118 to ensure that the liquid solvent stream 118 is not flashing when it is returned to the contactor 106. For example, the cooler 180 may chill the liquid solvent stream 118 to around 100° F. to 125° F.

FIG. 1 demonstrates the use of a known contactor 106 in the context of an acid gas treatment process. However, the gas processing facility 100 is also substantially representative of other types of purification processes. For example, the gas processing facility may be used in the context of a dehydration process. In that instance, the liquid solvent stream 118 may be a desiccant, such as a liquid glycol.

In some embodiments, a solvent that preferentially removes $H_2S$ molecules over $CO_2$ molecules may be used within the gas processing facility 100. For example, a tertiary amine typically does not effectively strip out $CO_2$ as quickly as $H_2S$. Such solvents may be useful for removing $H_2S$ from shale gas, which often includes a large amount of $H_2S$ but a negligible amount of $CO_2$. Moreover, two separate gas processing facilities 100 may be sequentially operated, with one configured to strip out primarily $H_2S$, and the other configured to strip out primarily $CO_2$. A separate $CO_2$ stream that is substantially free of $H_2S$ may also be generated.

Regardless of the application and the solvent used, the disadvantage of gas processing systems that include counter-current flow schemes, such as the conventional gas processing facility 100 of FIG. 1, is that comparatively low velocities are required to avoid entrainment of the downflowing liquid solvent in the sour natural gas stream 102. Also, relatively long distances are required for disengagement of the liquid droplets from the sour natural gas stream 102. Depending on the flow rate of the sour natural gas stream 102, the contactor 106 can be greater than 15 feet in diameter and more than 100 feet tall. For high-pressure applications, the vessel has thick, metal walls. Consequently, counter-current contactor vessels can be large and very heavy. This is expensive and undesirable, particularly for offshore oil and gas recovery applications.

In the gas processing facility 100 of FIG. 1, the contactor 106 includes a single contacting tower. However, in some applications, more than one contacting tower may be used. In addition, very large contactors may be used for high-volume, high-pressure applications. In the case of low-pressure applications, such as $CO_2$ removal from flue gas at a power generation plant, it is estimated that a 50 foot by 50 foot duct contactor would be used for a relatively small, 500 megawatt power plant flue gas application. Many hundreds of gallons per minute of solvent would also be flowed through the contactor. Thus, such operations may become very costly.

Further, the internals of the contactor 106 can make it susceptible to wave motion in an offshore environment. Therefore, it may be desirable to have a mass transfer process that does not rely on conventional tower internals. For example, it may be desirable to utilize a series of low pressure-drop, small contacting devices to remove $CO_2$ or $H_2S$ from flash-gas streams.

Embodiments described herein utilize a co-current flow scheme as an alternative to the counter-current flow scheme demonstrated in the contactor 106 of FIG. 1. The co-current flow scheme utilizes co-current contacting systems connected in series within a pipe. A natural gas stream and a liquid solvent move together, i.e., co-currently, within the co-current contacting systems. In some embodiments, the natural gas stream and the liquid solvent move together generally along the longitudinal axis of the respective co-current contacting system. In general, co-current contactors are not subject to the same hydraulic capacity limitations as counter-current contactors. As a result, co-current contactors tend to be smaller than counter-current contactors that utilize standard packed or trayed towers.

Gas Processing System with a Co-Current Flow Scheme

Figure 2:
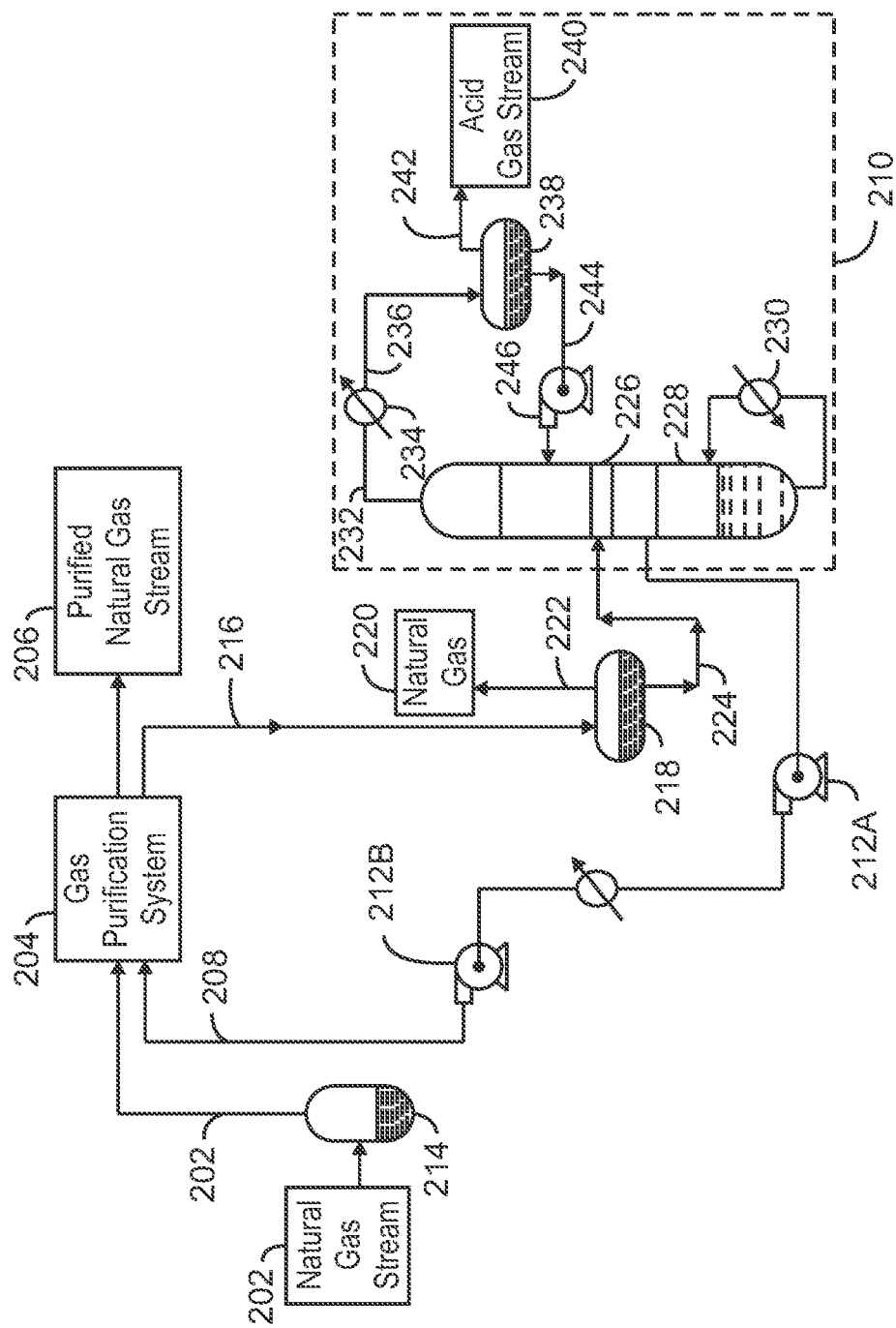
FIG. 2 is a process flow diagram of a gas processing system that includes a co-current flow scheme.

FIG. 2 is a process flow diagram of a gas processing system 200 that includes a co-current flow scheme. The gas processing system 200 may be an alternative to the gas processing facility 100 discussed with respect to FIG. 1. The gas processing system 200 may be used to purify a natural gas stream 202 by removing impurities, such as water or acid gases, from the natural gas stream 202.

The gas processing system 200 includes a gas purification system 204. In the past, the gas purification system 204 included one or more co-current contacting systems (CCCSs). Each CCCS included a co-current contactor (CCC) (not shown) and a separation system (not shown), as discussed further with respect to FIGS. 3A and 3B. However, according to embodiments described herein, the gas purification system 204 includes at least one co-axial co-current contacting system (CA-CCCS) that includes a co-axial co-current contactor (CA-CCC) (not shown), as discussed further with respect to FIG. 4A-G. Moreover, in some embodiments, the gas purification system 204 includes a combination of CCCSs and CA-CCCSs connected in any suitable configuration. For example, in some embodiments, the CCSs and CA-CCCSs are connected in a vertical configuration, while in other embodiments, the CCSs and CA-CCCSs are connected in a horizontal configuration.

The gas stream 202 may be a natural gas stream from a hydrocarbon production operation. For example, the gas stream 202 may be a raw natural gas stream extracted from a shale formation using hydraulic fracturing. The gas stream 202 may also be a flash gas stream taken from a flash drum in a gas processing facility itself. In addition, the gas stream 202 may be a tail gas stream from a Claus sulfur recovery process or an impurities stream from a regenerator. The gas stream 202 may also be an exhaust emission from a cement plant or other industrial plant. In this instance, $CO_2$ may be absorbed from excess air or from a nitrogen-containing flue gas. Furthermore, the gas stream 202 may be a fuel gas that needs to be conditioned.

The gas stream 202 may include a non-absorbing gas, such as methane, and impurities, such as acid gases. For example, the gas stream 202 may include $H_2S$ and $CO_2$. The gas processing system 200 may convert the gas stream 202 into a purified natural gas stream 206 by removing the acid gases.

In operation, the natural gas stream 202 may be flowed into the gas purification system 204, where it is mixed with a gas treating solution 208. As used herein, the term "gas treating solution" may include any liquid that is capable of removing impurities from a gas stream. For example, if the gas processing system 200 is to be used for the removal of $H_2S$ or other sulfur compounds, the gas treating solution 208 may include an amine-based solvent, or any solvent that is capable of absorbing acid gases. Such solvents may include, but are not limited to, monoethanolamine (MEA), 2(2-aminoethoxy) ethanol [Diglycolamine® (DGA)], diethanolamine (DEA), diisopropanolamine (DIPA), methyldiethanolamine (MDEA), triethyleneamine, FLEXSORB® SE, 2-amino-2methyl-1-propanol (AMP), or formulated amines such as FLEXSORB® SE PLUS, the UCARSOL™ family of products, or formulated MDEA solutions. Other solvents, such as physical solvents, alkaline salts solutions, or ionic liquids, may also be used for $H_2S$ removal. In embodiments used for other purposes, such as dehydration, other solvents or reactants, such as glycols, may be used.

In various embodiments, the gas treating solution 208 is a lean gas treating solution that has undergone a desorption process for the removal of acid gas impurities. This may be accomplished using a regenerator 210. Movement of the gas treating solution 208 from the regenerator 210 to the gas purification system 204 may be aided by a first pump 212A and a second pump 212B. The pumps 212A and 212B may cause the gas treating solution 208 to flow into the gas purification system 204 at a suitable pressure, for example, of about 15 psia to about 1,500 psig.

Before entering the gas purification system 204, the natural gas stream 202 may pass through an inlet separator 214. The inlet separator 214 may be used to clean the natural gas stream 202 by filtering out impurities, such as brine and drilling fluids. Some particle filtration may also take place. The cleaning of the natural gas stream 202 can prevent foaming of solvent during the acid gas treatment process.

In some embodiments, the natural gas stream 202 is also pretreated upstream of the inlet separator 214 or the gas purification system 204. For example, the natural gas stream 202 may undergo a water wash to remove glycol or other chemical additives. This may be accomplished via a separate processing loop (not shown) wherein water is introduced to the natural gas stream 202. Water has an affinity for glycol and will pull the glycol out of the natural gas stream 202. This, in turn, will help control foaming within the gas purification system 204. In the case of flue gas applications, corrosion inhibitors may be added to the solvent to retard the reaction of $O_2$ with the steel in the processes.

According to embodiments described herein, the gas treating solution 208 is flowed into the gas purification system 204. Once inside the gas purification system 204, the natural gas stream 202 and the gas treating solution 208 may move along the longitudinal axis of the gas purification system 204. As they travel, the gas treating solution 208 may interact with the impurities within the natural gas stream 202, causing the impurities to chemically attach to or be absorbed by the molecules within the gas treating solution 208. The natural gas stream 202 may then be separated from the molecules of the gas treating solution 208 with the absorbed impurities, forming the purified natural gas stream 206 and a partially-loaded gas treating solution 216.

The partially-loaded gas treating solution 216 may then be flowed out of a bottom portion of the gas purification system 204, and the purified natural gas stream 206 may be flowed out of a top portion of the gas purification system 204. The partially-loaded gas treating solution 216 may then be flowed through a flash drum 218 to begin the regeneration process. Absorbed natural gas 220 may be flashed from the partially-loaded gas treating solution 216 within the flash drum 218, and may be flowed out of the flash drum 218 via an overhead line 222.

The resulting rich gas treating solution 224 may be flowed from the flash drum 218 to the regenerator 210. The rich gas treating solution 224 may be introduced into the regenerator 210 for desorption. The regenerator 210 may include a stripper portion 226 including trays or other internals (not shown). The stripper portion 226 may be located directly above a reboiler portion 228. A heat source 230 may be provided with the reboiler portion 228 to generate heat. The regenerator 210 may produce the regenerated, lean gas treating solution 208 that is recycled for re-use in the gas purification system 204. Stripped overhead gas from the regenerator 210, which may include concentrated $H_2S$ (or $CO_2$), may be flowed out of the regenerator 210 as an overhead impurities stream 232.

The overhead impurities stream 232 may be flowed into a condenser 234, which may cool the overhead impurities stream 232. The resulting cooled impurities stream 236 may be flowed through a reflux accumulator 238. The reflux accumulator 238 may separate any remaining liquid, such as condensed water, from the impurities stream 236. This may result in the generation of a substantially pure acid gas stream 240, which may be flowed out of the reflux accumulator 238 via an overhead line 242. In addition, a residual liquid stream 244 may be flowed out of the bottom of the reflux accumulator 238. The residual liquid stream 244 may be flowed through a reflux pump 246, which may boost the pressure of the residual liquid stream 244 and pump the residual liquid stream 244 into the regenerator 210. The residual liquid stream 244 may then be combined with the gas treating solution within the regenerator 210 and flowed out of the regenerator 210 as part of the lean gas treating solution 208.

The process flow diagram of FIG. 2 is not intended to indicate that the gas processing system 200 is to include all of the components shown in FIG. 2. Further, any number of additional components may be included within the gas processing system 200, depending on the details of the specific implementation. For example, the gas processing system 200 may include any suitable types of heaters, chillers, condensers, liquid pumps, gas compressors, blowers, bypass lines, other types of separation and/or fractionation equipment, valves, switches, controllers, and pressure-measuring devices, temperature-measuring devices, level-measuring devices, or flow-measuring devices, among others.

Gas Purification Systems with Co-Current Flow Schemes

Figure 3A:
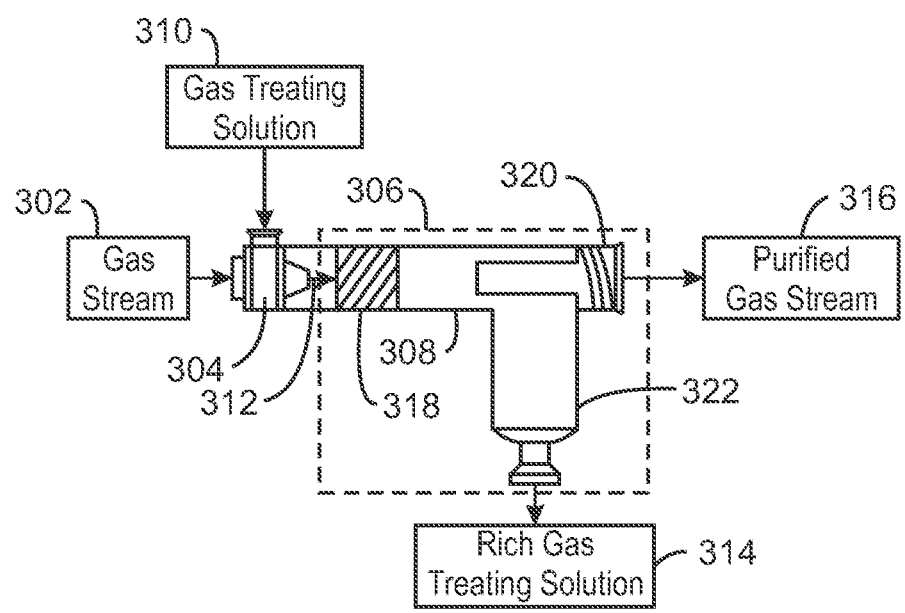
FIG. 3A is a process flow diagram of a co-current contacting system (CCCS)

FIG. 3A is a process flow diagram of a co-current contacting system (CCCS) 300. The CCCS 300 may be used to purify a gas stream 302 within a gas processing system, such as the gas processing system 200 of FIG. 2. The CCCS 300 includes a co-current contactor (CCC) 304 and a separation system 306 positioned in-line within a pipe 308.

The CCC 304 may include a number of components (not shown) that provide for the efficient contacting of the gas stream 302 with a liquid droplet stream (not shown) formed from a gas treating solution 310. The liquid droplet stream can be used for the separation of impurities, such as $H_2O$, $H_2S$, or $CO_2$, from the gas stream 302.

In various embodiments, the gas stream 302 is flowed through the pipe 308 and into the CCC 304. The gas treating solution 310 is also flowed into the CCC 304, for example, into a hollow space (not shown) coupled to flow channels (not shown) in the CCC 304. The gas treating solution 310 may include any type of treating liquid that is capable of removing the impurities from the gas stream 302.

From the flow channels, the gas treating solution 310 is released into the gas stream 302 as fine droplets through injection orifices (not shown), resulting in a treated gas stream 312. The treated gas stream 312 may include small liquid droplets dispersed in a gas phase. The liquid droplets may include impurities from the gas stream 302 that were absorbed or dissolved into the gas treating solution 310.

The treated gas stream 312 is then flowed into the separation system 306. The separation system 306 removes the liquid droplets from the gas phase, producing a rich gas treating solution 314 and a purified gas stream 316. In some embodiments, the purified gas stream 316 is a dehydrated gas stream that has been purified via the removal of $H_2O$. In other embodiments, the purified gas stream 316 is a sweetened gas stream that has been purified via the removal of acid gases.

According to the embodiment shown in FIG. 3A, the separation system 306 includes a swirl element 318, an anti-swirl element 320, and a liquid collection boot 322. The swirl element 318 imparts cyclonic motion to the fluids within the pipe 308. This causes the small liquid droplets to coalesce into larger droplets. The heavier liquid droplets then flow along the wall of the pipe 308, while the gas phase flows along the center of the pipe 308. The anti-swirl element 320 then straightens the flow of the gas phase, while the liquid droplets flow into the liquid collection boot 322. From the liquid collection boot 322, the liquid droplets flow out of the CCCS 300 as the rich gas treating solution 314.

Figure 3B:
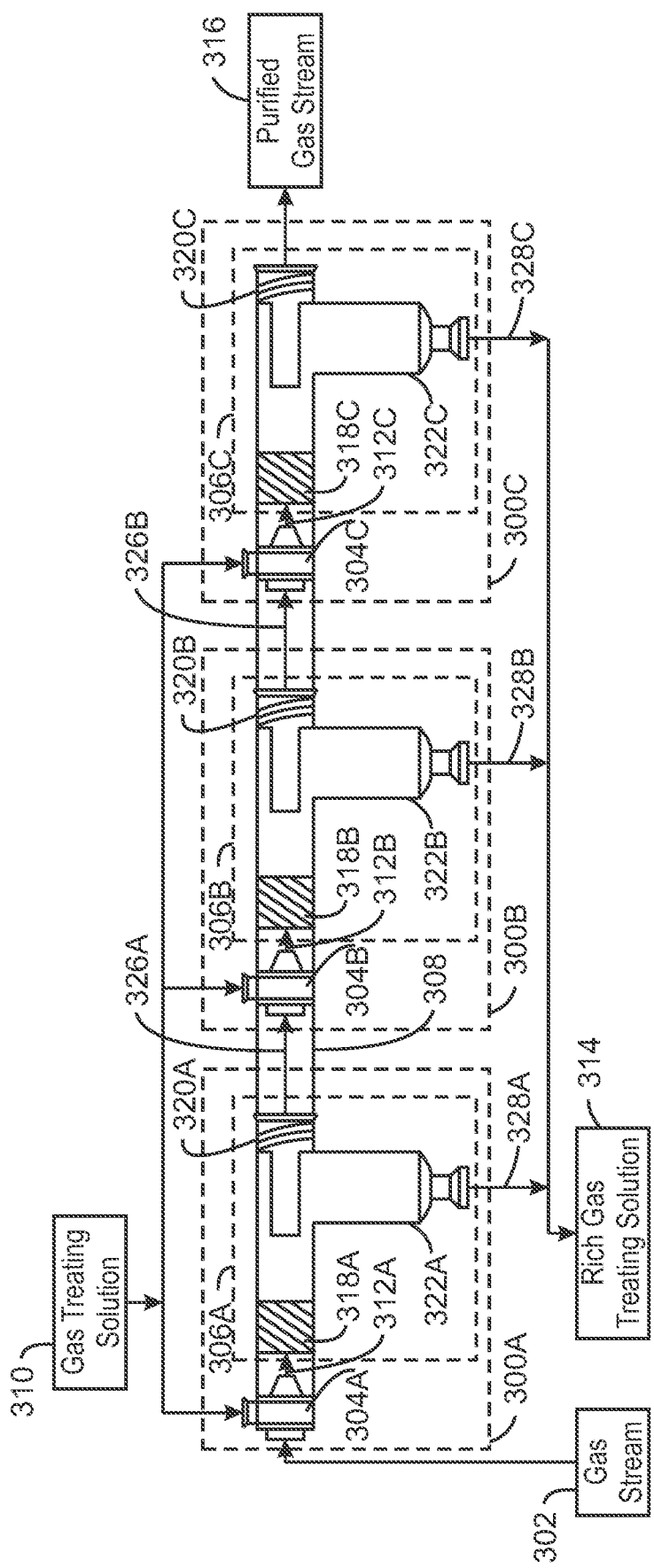
FIG. 3B is a process flow diagram of a gas purification system including a number of the CCCSs of FIG. 3A.

FIG. 3B is a process flow diagram of a gas purification system 324 including a number of the CCCSs 300A-C of FIG. 3A. Like numbered items are as described with respect to FIG. 3A. In various embodiments, the gas purification system 324 is implemented within a gas processing system. For example, in some embodiments, the gas purification system 324 corresponds to the gas purification system 204 of FIG. 2.

The CCCSs 300A-C are connected in series within the pipe 308 and are used to sequentially remove impurities from the gas stream 302, producing the purified gas stream 316. Specifically, the first CCCS 300A produces a first partially-purified gas stream 326A. The second CCCS 302B produces a second partially-purified gas stream 326B, and the third CCCS 300C produces the final purified gas stream 316.

In addition, each CCCS 300A-C produces a corresponding partially-loaded gas treating solution 328A-C. According to the embodiment shown in FIG. 3B, the partially-loaded gas treating solution 328A-C are combined to produce the rich gas treating solution 314, which may then be sent to a regenerator (not shown). However, in other embodiments, one or more of the partially-loaded gas treating solutions 328B and 328C may be recycled to a previous CCCS 300A and 300B via inter-stage recycling. Moreover, one or more of the partially-loaded gas treating solutions 328A-C may be recycled to the same CCCS 300A-C via intra-stage recycling.

According to the embodiment shown in FIG. 3B, the CCCSs 300A, 300B, and 300C are connected in series within the pipe 308. However, it is to be understood that the CCCSs 300A, 300B, and 300C may also be connected in parallel, or in any other suitable configuration. Moreover, while the embodiment shown in FIG. 3B includes three CCCSs 300A, 300B, and 300C, it is to be understood that any number of additional CCCSs may also be included within the gas purification system 324.

The CCCSs 300A-C discussed with respect to FIGS. 3A and 3B include the liquid collection boots 322A-C within the separation systems 306A-C. In practice, the liquid collection boots 322A-C are the largest diameter equipment within the entire gas purification system 324. Therefore, it is desirable to minimize the number of liquid collection boots 322A-C that must be utilized within the gas purification system 324. Reducing the number of liquid collection boots 322A-C would allow the piping for the gas purification system 324 to be configured in a more compact manner, and would reduce the number of flanges within the gas purification system 324. This, in turn, would result in a safer facility with fewer chances of hydrocarbon leaks and fugitive emissions.

Figure 4A:
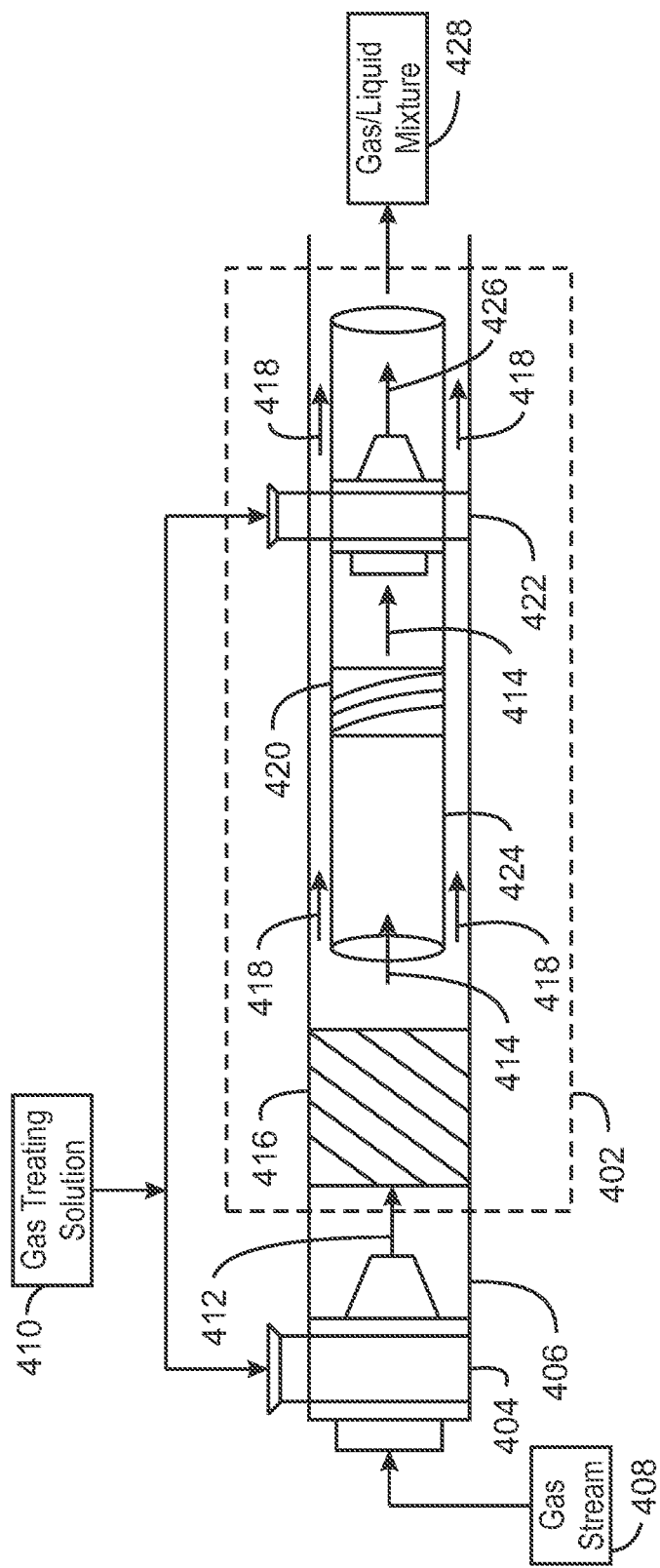
FIG. 4A is a process flow diagram of a gas purification system with a co-axial co-current flow scheme.

FIG. 4A is a process flow diagram of a gas purification system 400 with a co-axial co-current flow scheme In various embodiments, the gas purification system 400 is implemented within a gas processing system. For example, in some embodiments, the gas purification system 400 corresponds to the gas purification system 204 of FIG. 2.

The gas purification system 400 includes a CA-CCCS 402 located downstream of a CCC 404 within an outer pipe 406. According to embodiments described herein, the CA-CCCS 402 replaces the separation system of a CCCS, such as the separation system 306 of the CCCS 300 of FIG. 3A. This reduces the number of liquid collection boots needed to purify a gas stream 408.

In various embodiments, the CCC 404 is the same as, or similar to, the CCC 304 describe with respect to FIGS. 3A and 3B. More specifically, the CCC 404 may include a number of components (not shown) that provide for the efficient contacting of the gas stream 408 with a liquid droplet stream (not shown) formed from a gas treating solution 410. The liquid droplet stream can be used for the separation of impurities, such as $H_2O$, $H_2S$, or $CO_2$, from the gas stream 408.

In various embodiments, the gas stream 408 is flowed through the outer pipe 406 and into the CCC 404. The gas treating solution 410 is also flowed into the CCC 404, for example, into a hollow space (not shown) coupled to flow channels (not shown) in the CCC 404. The gas treating solution 410 may include any type of treating liquid that is capable of removing the impurities from the gas stream 408.

From the flow channels, the gas treating solution 410 is released into the gas stream 408 as fine droplets through injection orifices (not shown), resulting in a first treated gas stream 412. The first treated gas stream 412 may include small liquid droplets dispersed in a gas phase 414. The liquid droplets may include impurities from the gas stream 408 that were absorbed or dissolved into the gas treating solution 410.

The first treated gas stream 412 is then flowed into the CA-CCCS 402. Specifically, the first treated gas stream 412 is flowed into a swirl element 416 within the CA-CCCS 402. The swirl element 416 imparts cyclonic motion to the first treated gas stream 412. This causes the small liquid droplets within the first treated gas stream 412 to coalesce into heavier liquid droplets 418. The heavier liquid droplets 418 then flow along the wall of the outer pipe 406, while the gas phase 414 flows along the center of the outer pipe 406.

The second portion of the CA-CCCS 402 includes an anti-swirl element 420 and a co-axial co-current contactor (CA-CCC) 422 arranged in a two pipe configuration. The two pipe configuration includes the outer pipe 406 and an inner pipe 424. In some embodiments, the CA-CCC 422 has a symmetrical configuration in which the outer pipe 406 and the inner pipe 424 share a common axis. However, in other embodiments, the CA-CCC 422 has an asymmetrical configuration in which the outer pipe 406 and the inner pipe 424 do not share a common axis.

The two pipe configuration allows the heavier liquid droplets 418 to flow between the outer pipe 406 and the inner pipe 424, while the gas phase 414 flows into the anti-swirl element 420, which is located within the inner pipe 424. The anti-swirl element 420 then straightens the flow of the gas phase 414 before it enters the CA-CCC 422.

According to embodiments described herein, the CA-CCC 422 includes a number of components (not shown) that provide for the efficient contacting of the gas phase 414 with a liquid droplet stream (not shown) formed from the gas treating solution 410. The specific components of the CA-CCC 422 are described with respect to FIGS. 5A-E. According to embodiments described herein, the two pipe configuration of the CA-CCC 422 allows the heavier liquid droplets 418 from the upstream CCC 404 to flow along the inner wall of the outer pipe 406 without contacting the gas phase 414 within the CA-CCC 422.

Within the portion of the CA-CCC 422 located inside the inner pipe 424, the gas treating solution 410 is released into the gas phase 414 as fine droplets through liquid injection orifices (not shown), resulting in a second treated gas stream 426. The second treated gas stream 426 may include small liquid droplets dispersed in a gas phase. The liquid droplets may include impurities from the gas phase 414 that were absorbed or dissolved into the gas treating solution 410.

The second treated gas stream 426 is then flowed along the inner pipe 424 for some length before the inner pipe 424 ends. The heavier liquid droplets 418 then mix with the liquid droplets within the second treated gas stream 426, forming a gas/liquid mixture 428 that includes a rich gas treating solution and a partially-purified gas stream. The gas/liquid mixture 428 may then be flowed to the next process (not shown) within the gas purification system 400. The next process within the gas purification system 400 may be one of many options, as described further with respect to FIGS. 4B-G.

The process flow diagram of FIG. 4A is not intended to indicate that the gas purification system 400 is to include all of the components shown in FIG. 4A. Further, any number of additional components may be included within the gas purification system 400, depending on the details of the specific implementation.

Figure 4B:
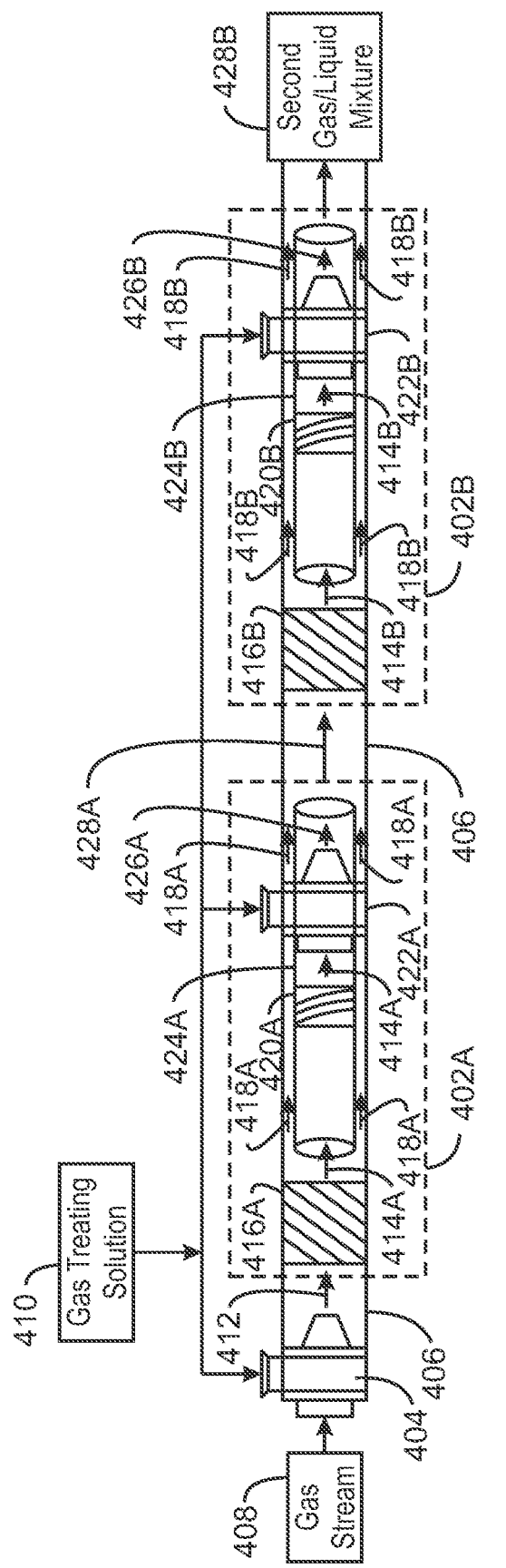
FIG. 4B is a process flow diagram of another gas purification system with a co-axial co-current flow scheme.

FIG. 4B is a process flow diagram of another gas purification system 430 with a co-axial co-current flow scheme. Like numbered items are as described with respect to FIG. 4A. In various embodiments, the gas purification system 430 is implemented within a gas processing system. For example, in some embodiments, the gas purification system 430 corresponds to the gas purification system 204 of FIG. 2.

FIG. 4B illustrates how CA-CCCSs can be used for two or more stages in series. Specifically, the gas purification 430 includes the CCC 404 and two CA-CCCSs 402A and 402B connected in series within the pipe 406. The first CA-CCCS 402A produces a first gas/liquid mixture 428A including a first rich gas treating solution and a first partially-purified gas stream, and the second CA-CCCS 402B produces a second gas/liquid mixture 428B including a second rich gas treating solution and a second partially-purified gas stream. While only two stages are shown in FIG. 4B, it is to be understood that any number of additional CA-CCCSs may be included within the gas purification system 430, depending on the details of the specific implementation. Moreover, it is to be understood that the CCC 404 and the CA-CCCSs 402A and 402B within the gas purification system 430 can also be arranged in a parallel configuration, or any other suitable configuration.

Figure 4C:
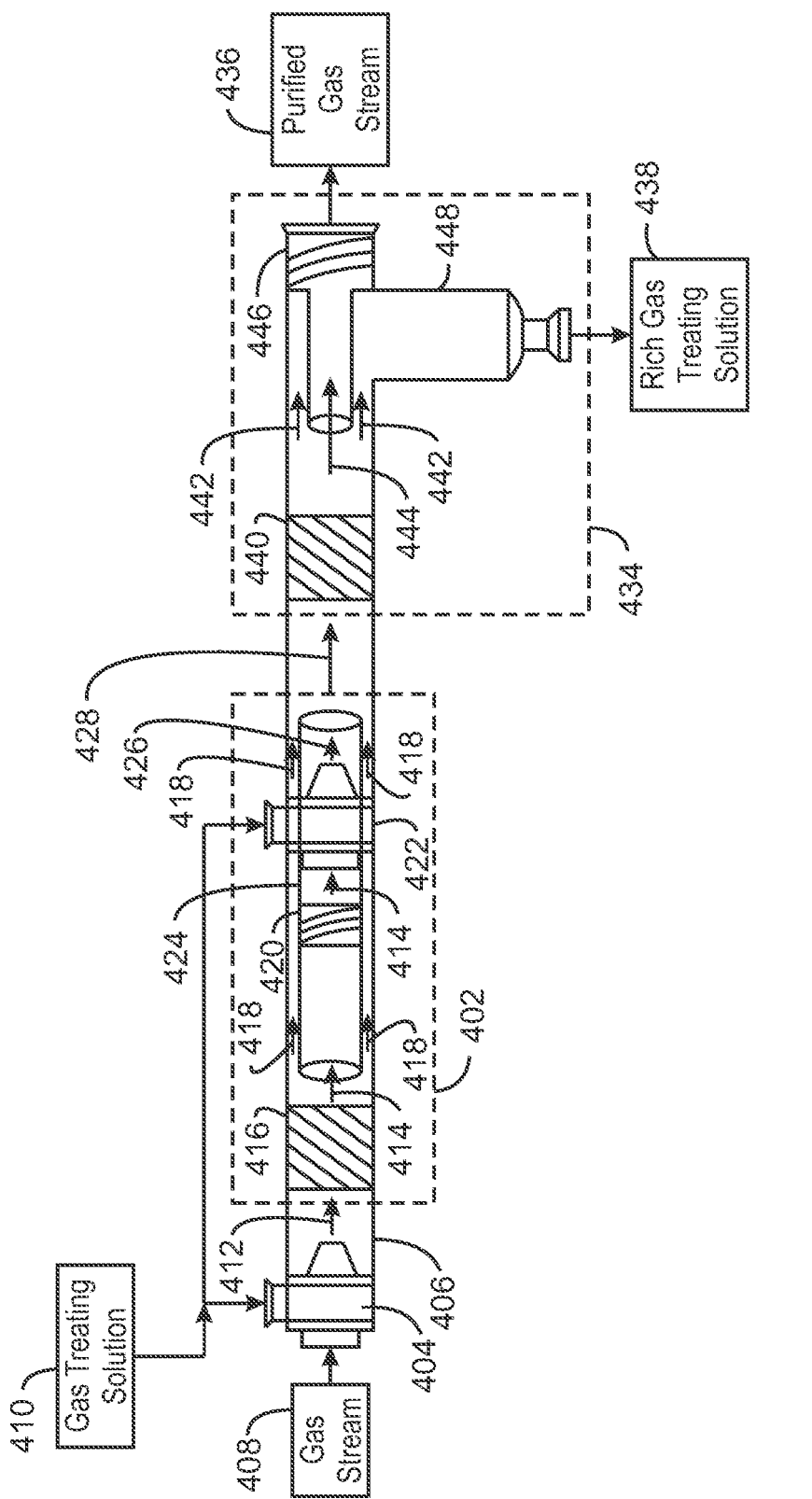
FIG. 4C is a process flow diagram of another gas purification system with a co-axial co-current flow scheme.

FIG. 4C is a process flow diagram of another gas purification system 432 with a co-axial co-current flow scheme Like numbered items are as described with respect to FIGS. 4A and 4B. In various embodiments, the gas purification system 432 is implemented within a gas processing system. For example, in some embodiments, the gas purification system 432 corresponds to the gas purification system 204 of FIG. 2.

The gas purification system 432 includes the CCC 404, the CA-CCCS 402, and a separation system 434 connected in series within the pipe 406. The separation system 434 separates the gas/liquid mixture 428 exiting the CA-CCCS 402 into a purified gas stream 436 and a rich gas treating solution 438. More specifically, the gas/liquid mixture 428 is flowed into a swirl element 440 of the separation system 434. The swirl element 440 imparts cyclonic motion to the fluids within the pipe 406. This causes the small liquid droplets within the gas/liquid mixture 428 to coalesce into heavier liquid droplets 442. The heavier liquid droplets 442 then flow along the wall of the pipe 406, while a gas phase 444 flows along the center of the pipe 406 and into an anti-swirl element 446. The anti-swirl element 446 then straightens the flow of the gas phase 444, while the heavier liquid droplets 442 flow into a liquid collection boot 448. The gas phase 444 then flows out of the anti-swirl element 446 as the purified gas stream 436, and the heavier liquid droplets 442 flow out of the liquid collection boot 448 as the rich gas treating solution 438. The purified gas stream 436 may then be sent to a downstream process, and the rich gas treating solution 438 may be sent to a regenerator (not shown).

The process flow diagram of FIG. 4C is not intended to indicate that the gas purification system 432 is to include all of the components shown in FIG. 4C. Further, any number of additional components may be included within the gas purification system 432, depending on the details of the specific implementation.

Figure 4D:
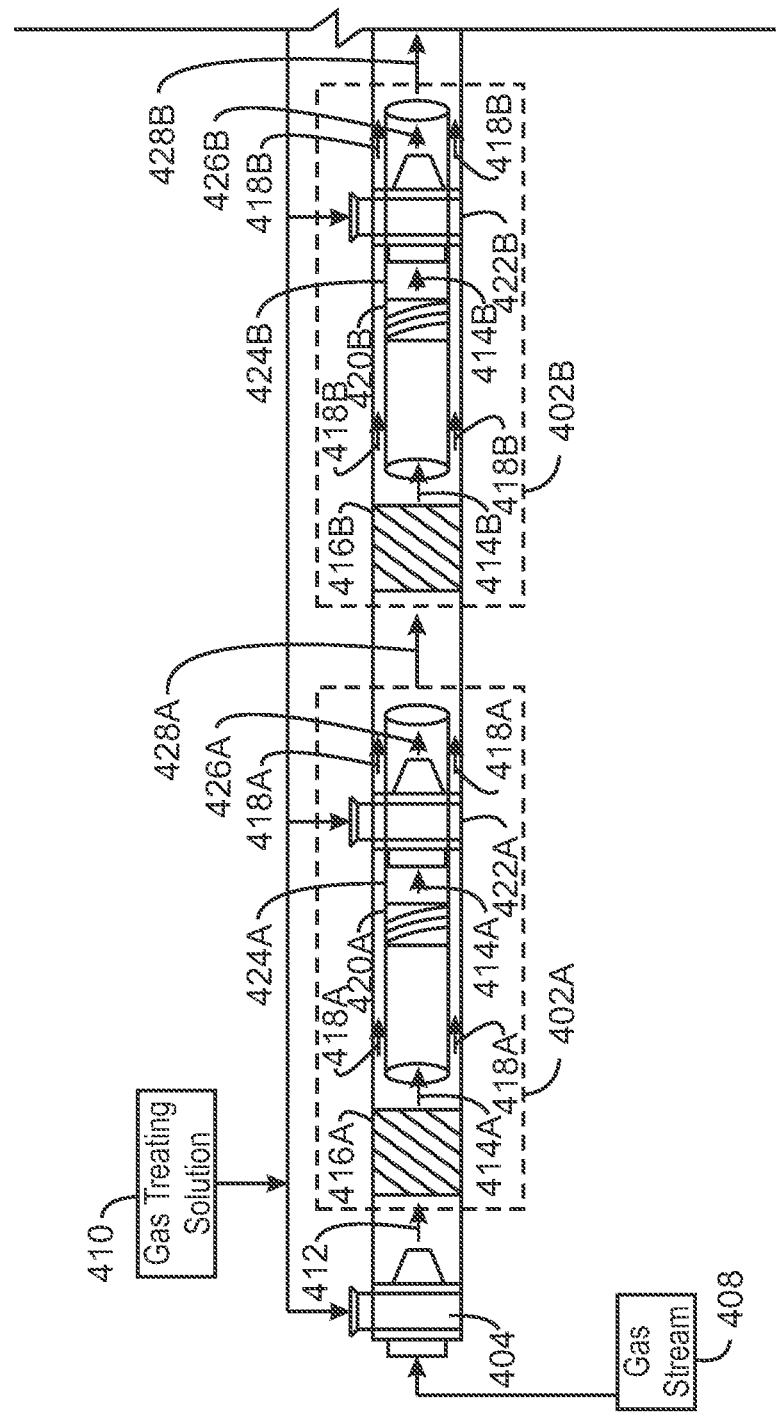
FIGS. 4D and 4E are a process flow diagram of another gas purification system with a co-axial co-current flow scheme.
Figure 4E:
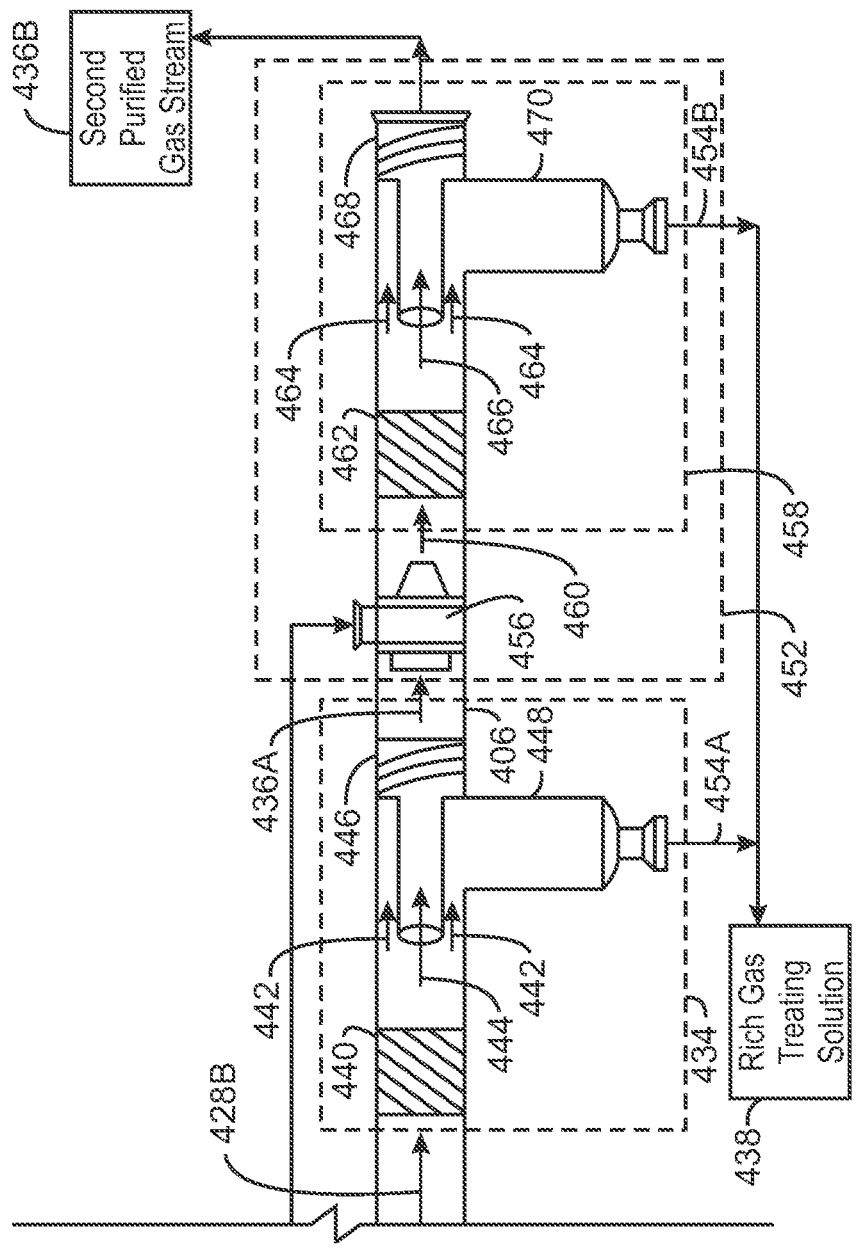

FIGS. 4D and 4E are a process flow diagram of another gas purification system 450 with a co-axial co-current flow scheme. Like numbered items are as described with respect to FIGS. 4A-C. In various embodiments, the gas purification system 450 is implemented within a gas processing system. For example, in some embodiments, the gas purification system 450 corresponds to the gas purification system 204 of FIG. 2.

The gas purification system 450 includes the CCC 404, two CA-CCCSs 402A and 402B, the separation system 434, and a CCCS 452 connected in series within the pipe 406. As discussed with respect to FIG. 4B, the first CA-CCCS 402A produces the first gas/liquid mixture 428A, and the second CA-CCCS 402B produces the second gas/liquid mixture 428B. As discussed with respect to FIG. 4C, the separation system 434 then separates the second gas/liquid mixture 428B exiting the second CA-CCCS 402B into a first portion 454A of the rich gas treating solution 438 and a first purified gas stream 436A. The first purified gas stream 436A is the first gas stream downstream of the CCC 404 and the CA-CCCSs 402A and 402B after liquids have been removed via the separation system 434.

According to the embodiment shown in FIGS. 4D and 4E, the first purified gas stream 436A is then flowed into the CCCS 452. As described with respect to FIGS. 3A and 3B, the CCCS 452 includes a second CCC 456 and a second separation system 458. The second CCC 456 produces a second treated gas stream 460, and a swirl element 462 within the second separation system 458 causes heavier liquid droplets within the second treated gas stream 460 to coalesce into heavier liquid droplets 464. The heavier liquid droplets 464 then flow along the wall of the pipe 406, while a gas phase 466 flows along the center of the pipe 406 and into an anti-swirl element 468. The anti-swirl element 468 then straightens the flow of the gas phase 466, while allowing the heavier liquid droplets 464 to flow into a second liquid collection boot 470. The gas phase 466 then flows out of the anti-swirl element 468 as a second purified gas stream 436B, while the heavier liquid droplets 464 flow out of the second liquid collection boot 470 as a second portion 454B of the rich gas treating solution 438. The second purified gas stream 436B may then be sent to a downstream process, and the rich gas treating solution 438 may be sent to a regenerator (not shown).

The process flow diagram of FIGS. 4D and 4E is not intended to indicate that the gas purification system 450 is to include all of the components shown in FIGS. 4D and 4E. Further, any number of additional components may be included within the gas purification system 450, depending on the details of the specific implementation.

Figure 4F:
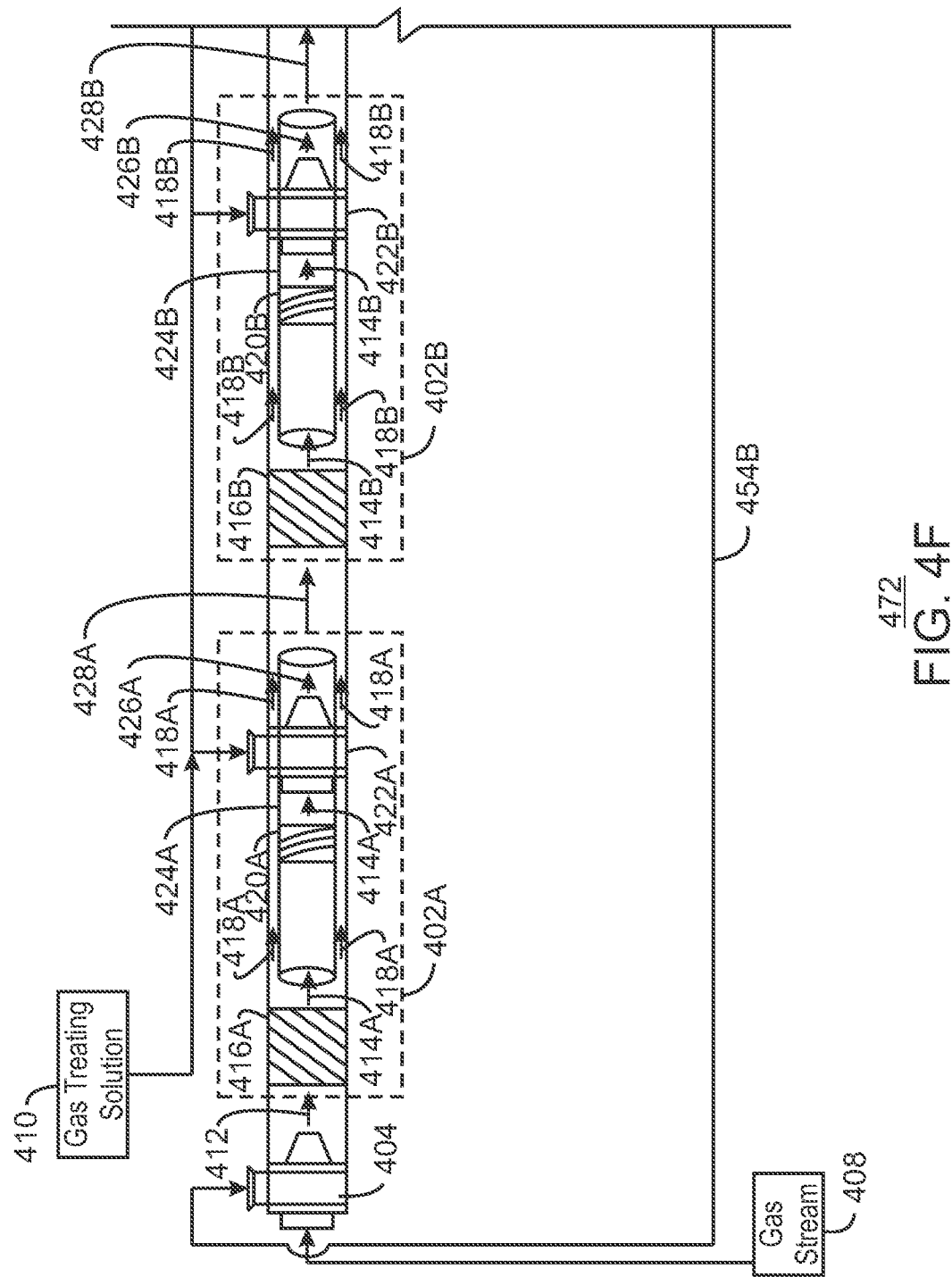
FIGS. 4F and 4G are a process flow diagram of a gas purification system with a co-axial co-current flow scheme and a semi counter-current configuration.
Figure 4G:
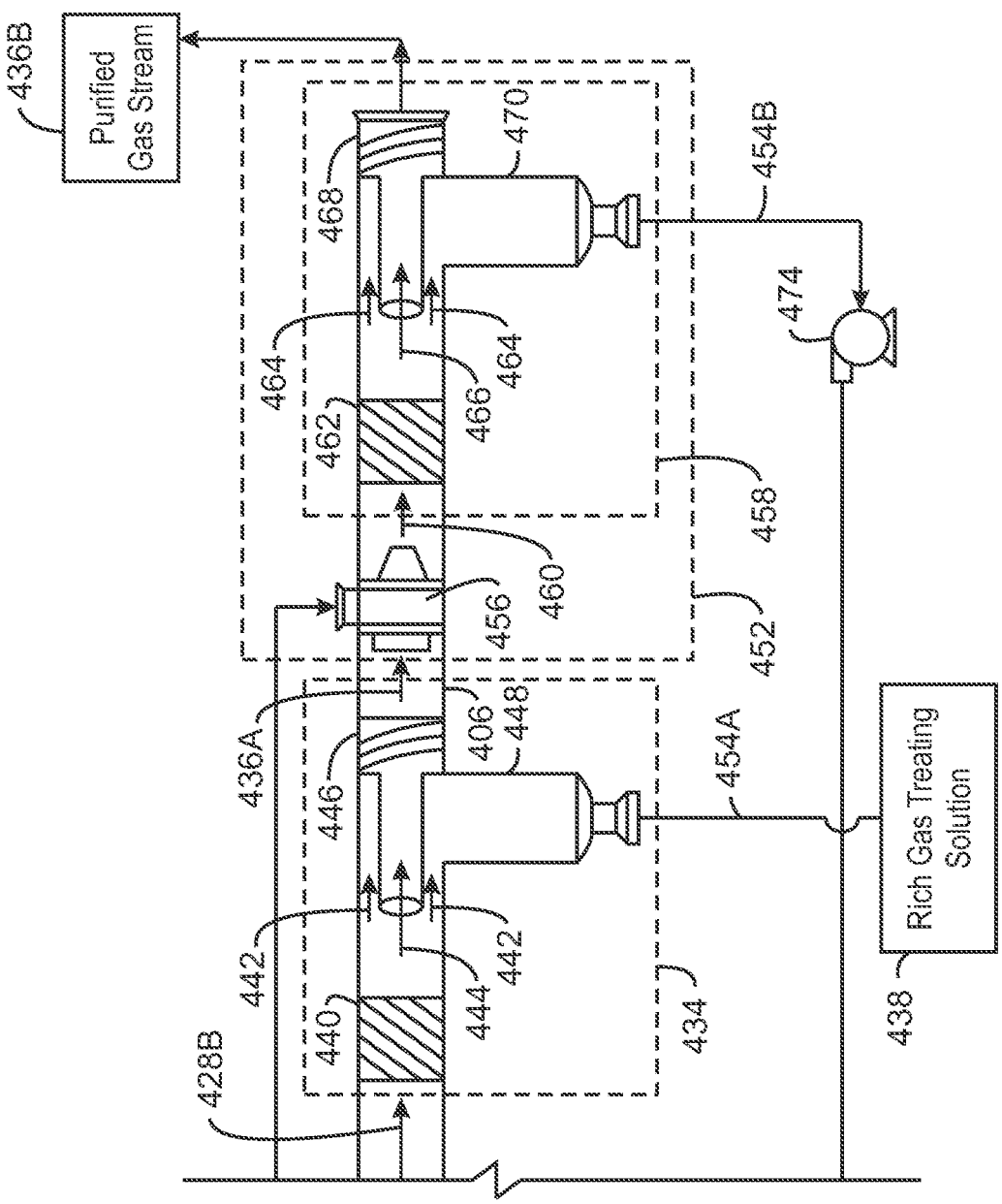

FIGS. 4F and 4G are a process flow diagram of a gas purification system 472 with a co-axial co-current flow scheme and a semi counter-current configuration. Like numbered items are as described with respect to FIGS. 4A-E. According to the embodiment shown in FIGS. 4F and 4G, the gas purification system 472 is identical to the gas purification system 450 of FIGS. 4D and 4E, except that it includes a semi counter-current configuration wherein the second portion 454B of the rich gas treating solution 438 is recycled into the CCC 404. Movement of the second portion 454B of the rich gas treating solution 438 to the CCC 404 may be aided by a pump 474. The pump 474 may cause the second portion 454B of the rich gas treating solution 438 to flow into the CCC 404 at a suitable pressure, for example, of about 15 psia to about 1,500 psig.

The process flow diagram of FIGS. 4F and 4G is not intended to indicate that the gas purification system 472 is to include all of the components shown in FIGS. 4F and 4G. Further, any number of additional components may be included within the gas purification system 472, depending on the details of the specific implementation.

According to the embodiment shown in FIGS. 4F and 4G, the second portion 454B of the rich gas treating solution 438 is only recycled to the CCC 404. However, in other embodiments, the second portion 454B of the rich gas treating solution 438 is also recycled to the CA-CCCs 422A and 422B such that the gas treating solution 410 is only fed into the second CCC 456. Moreover, in other embodiments, the gas purification system 472 may be configured in any suitable manner to accommodate inter-stage and/or intra-stage recycling of the first portion 454A and/or the second portion 454B of the rich gas treating solution 438.

Co-Axial Co-Current Contactor

Figure 5A:
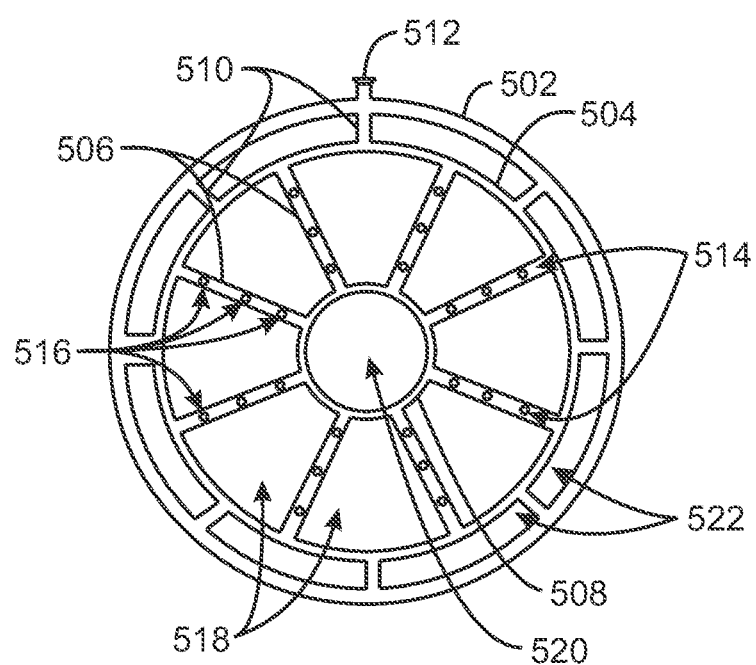
FIG. 5A is a front view of a co-axial co-current contactor (CA-CCC)

FIG. 5A is a front view of a co-axial co-current contactor (CA-CCC) 500. The CA-CCC 500 may be implemented within a gas purification system, such as the gas purification systems 400, 430, 432, 450, and 472 of FIGS. 4A-G. The CA-CCC 500 may be an in-line co-current contactor including a two pipe configuration. The front view of the CA-CCC 500 represents an upstream view of the CA-CCC 500.

The CA-CCC 500 includes an outer annular support ring 502, an inner annular support ring 504, a number of radial blades 506 extending from the inner annular support ring 504, and a central gas entry cone 508. The outer annular support ring 502 secures the CA-CCC 500 in-line within an outer pipe (not shown), and the inner annular support ring 504 secures the CA-CCC 500 in-line within an inner pipe (not shown). In some embodiments, the outer and inner annular support rings 502 and 504 are part of the outer and inner pipes, respectively. More specifically, the outer and inner annular support rings 502 and 504 may constitute portions of the outer and inner pipes that correspond to the CA-CCC 500. In various embodiments, the outer annular support ring 502 is designed as flanged connection. Moreover, according to embodiments described herein, the portion of the CA-CCC 500 residing within the inner pipe is referred to as the "inner portion," while the portion of the CA-CCC 500 residing between the inner pipe and the outer pipe is referred to as the "outer portion."

The inner annular support ring 504 is attached to the outer annular support ring 502 by a number of internal support structures 510. In addition, the central gas entry cone 508 is attached to the inner annular support ring 504 by the radial blades 506.

The CA-CCC 500 includes one or more lean liquid inlets 512 along the outer annular support ring 502 that allow a lean liquid stream (not shown) to flow into the CA-CCC 500. In various embodiments, the lean liquid stream is a lean gas treating solution that is capable of purifying a gas stream (not shown). From the lean liquid inlet(s) 512, the lean liquid stream flows through the internal support structures 510 to reach the inner annular support ring 504. From the inner annular support ring 504, the lean liquid stream flows through lean liquid flow channels 514 within the radial blades. The lean liquid stream then flows through a number of liquid injection orifices 516 within the radial blades 506 and is injected into a number of gas flow channels 518 located between the radial blades 506.

The liquid injection orifices 516 may be located on or near the leading edge of each radial blade 506. Placement of the liquid injection orifices 516 on the radial blades 506 may allow the lean liquid stream to be uniformly distributed in the gas stream within the gas flow channels 518. Specifically, the lean liquid stream may be contacted by the gas stream flowing through the gaps between the radial blades 506, and may be sheared into small droplets and entrained in the gas phase.

The gas stream may also be flowed into the central gas entry cone 508 through a gas inlet 520. The central gas entry cone 508 may block a cross-sectional portion of the pipe. The radial blades 506 may include gas exit slots (not shown) that allow the gas stream to flow out of the central gas entry cone 508. This may increase the velocity of the gas stream as it flows through the pipe. The central gas entry cone 508 may direct a predetermined amount of the gas stream to the gas exit slots on the radial blades 506.

In addition, the CA-CCC 500 includes a number of rich liquid flow channels 522 located between the outer annular support ring 502 and the inner annular support ring 504. The rich liquid flow channels 522 allow a rich liquid stream from an upstream co-current contactor (CCC), for example, to flow along the outer diameter of the pipe. In this manner, the CA-CCC 500 utilizes a pipe-within-a-pipe configuration to perform the function of a CCC and a separation system simultaneously. This allows the CA-CCC 500 to replace the heavy liquid collection boot that is typically included within the separation system of a CCCS. In addition, the CA-CCC 500 performs the function of the downstream CCC for the next stage.

In various embodiments, some of the lean liquid stream injected through the radial blades 506 is deposited on the surface of the radial blades 506 as a liquid film. As the gas stream flows through the central gas entry cone 508 and is directed out of the gas exit slots on the radial blades 506, the gas stream may sweep, or blow, much of the liquid film off the radial blades 506. This may enhance the dispersion of the liquid stream into the gas phase. Further, the obstruction to the flow of the gas stream and the shear edges created by the central gas entry cone 508 may provide a zone with an increased turbulent dissipation rate. This may result in the generation of smaller droplets that enhance the mass transfer rate of the liquid stream and the gas stream.

The size of the CA-CCC 500 may be adjusted such that the gas stream flows at a high velocity. This may be accomplished by either a sudden reduction in the diameter of the outer and inner annular support rings 502 and 504 or a gradual reduction in the diameter of the outer and inner annular support rings 502 and 504. The outer wall of the CA-CCC 500 may be slightly converging in shape, terminating at the point where the gas stream and the liquid stream are discharged into the downstream pipe. This may allow for the shearing and re-entrainment of any liquid film that is removed from the CA-CCC 500. Further, a radial inward ring, grooved surface, or other suitable equipment may be included on the outer diameter of the CA-CCC 500 near the point where the gas stream and the liquid stream are discharged into the downstream pipe. This may enhance the degree of liquid entrainment within the gas phase.

The downstream end of the CA-CCC 500 may discharge into a section of pipe (not shown). The section of pipe may be a straight section of pipe, or a concentric expansion section of pipe. In some embodiments, the central gas entry cone 508 terminates with a blunt ended cone or a tapered ended cone. In other embodiments, the central gas entry cone 508 terminates with a ridged cone, which may include multiple concentric ridges along the cone that provide multiple locations for droplet generation. In addition, any number of gas exit slots (not shown) may be provided on the cone itself to allow for the removal of the liquid film from the CA-CCC 500.

Figure 5B:
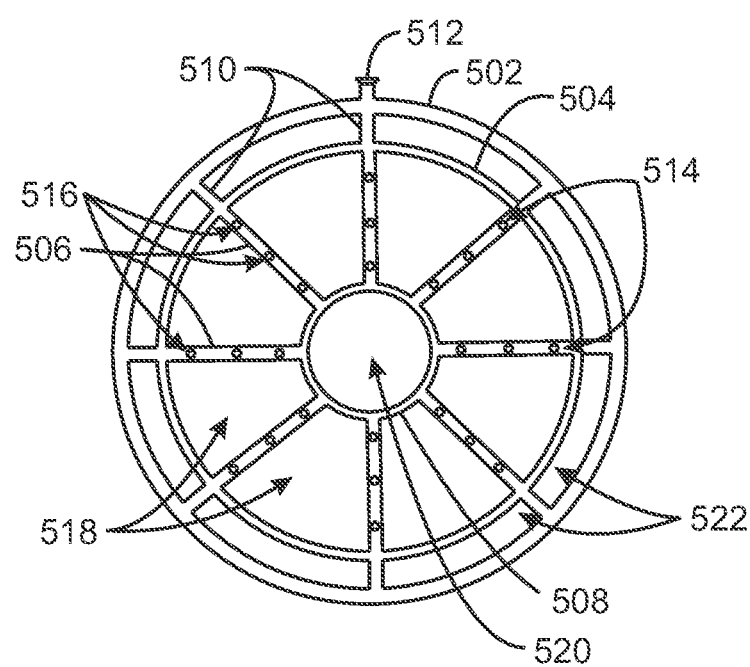
FIG. 5B is a front view of another configuration of the CA-CCC of FIG. 5A.

FIG. 5B is a front view of another configuration of the CA-CCC 500 of FIG. 5A. Like numbered items are as described with respect to FIG. 5A. The configuration shown in FIG. 5B includes a slight change in the location of the radial blades 506 that may allow the lean liquid stream to flow more freely through the CA-CCC 500.

Figure 5C:
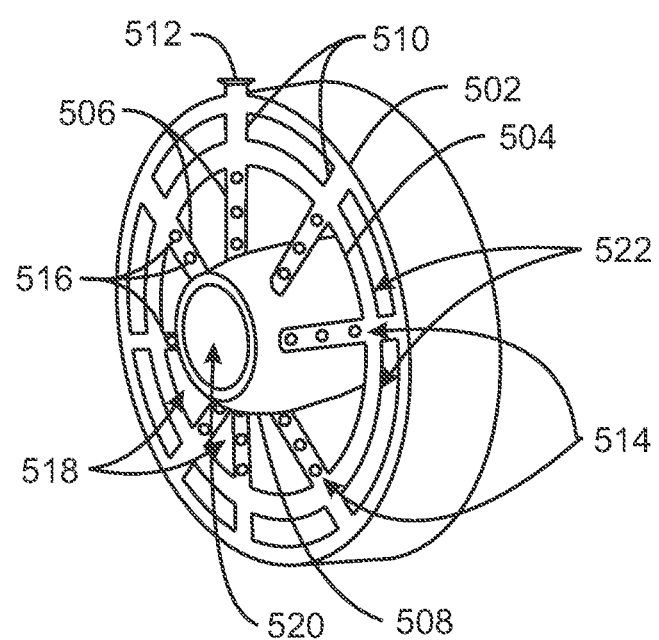
FIG. 5C is a side perspective view of the CA-CCC.

FIG. 5C is a side perspective view of the CA-CCC 500. Like numbered items are as described with respect to FIG. 5B. As shown in FIG. 5C, the upstream portion of the central gas entry cone 508 may extend further into the pipe than the outer annular support ring 502, the inner annular support ring 504, and the radial blades 506 in the upstream direction.

In some embodiments, the downstream portion of the central gas entry cone 508 also extends further into the pipe than the outer annular support ring 502, the inner annular support ring 504, and the radial blades 506 in the downstream direction. The length of the central gas entry cone 508 in the downstream direction depends on the type of cone at the end of the central gas entry cone 508, as discussed further with respect to FIGS. 5D and 5E.

Figure 5D:
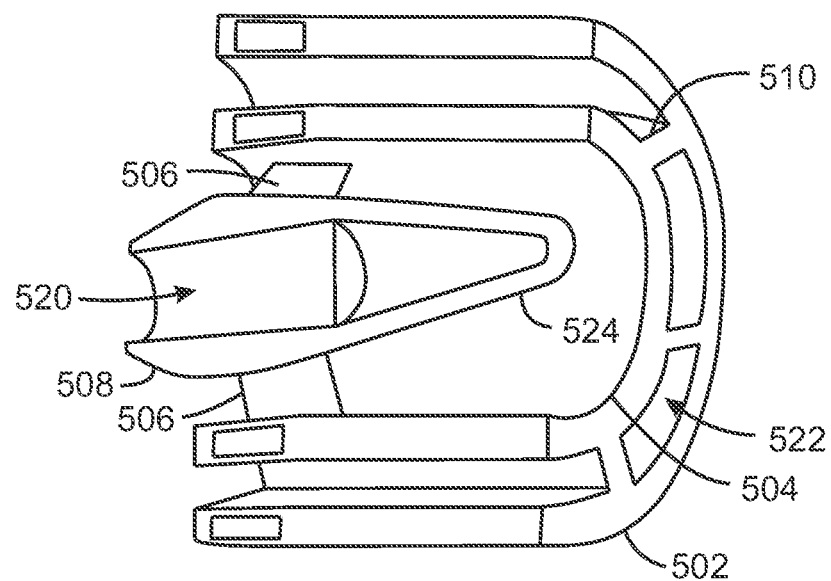
FIG. 5D is a cross-sectional side perspective view of the CA-CCC.

FIG. 5D is a cross-sectional side perspective view of the CA-CCC 500. Like numbered items are as described with respect to FIGS. 5A-C. According to the embodiment shown in FIG. 5D, the central gas entry cone 508 of the CA-CCC 500 terminates with a tapered ended cone 524. Terminating the central gas entry cone 508 with a tapered ended cone 524 may reduce the overall pressure drop in the pipe caused by the CA-CCC 500.

Figure 5E:
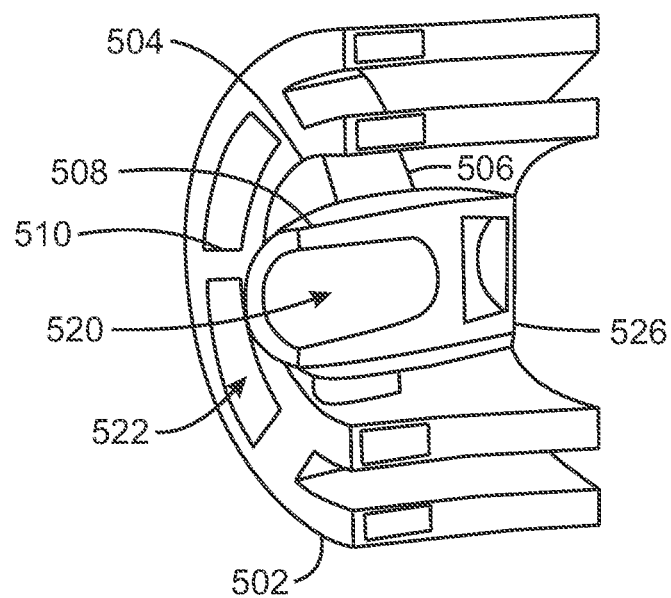
FIG. 5E is another cross-sectional side perspective view of the CA-CCC.

FIG. 5E is another cross-sectional side perspective view of the CA-CCC 500. Like numbered items are as described with respect to FIGS. 5A-D. According to the embodiment shown in FIG. 5E, the central gas entry cone 508 of the CA-CCC 500 terminates with a blunt ended cone 526. Terminating the central gas entry cone 508 with a blunt ended cone 526 may encourage droplet formation in the center of the pipe.

As shown in FIGS. 5D and 5E, in various embodiments, the inner pipe continues for some length past the central gas entry cone 508 before it terminates. This allows the gas stream to be contacted by the lean liquid stream within the inner pipe for some distance before it is merged with the rich liquid stream flowing along the outer pipe.

FIGS. 5A-E show several exemplary configurations of the CA-CCC 500. However, it is to be understood that the components of the CA-CCC 500 may also be arranged in any other suitable configuration. For example, in some embodiments, the internal support structures 510 are angled such that they promote the disturbance caused to the cyclonic flow of the rich liquid stream in the rich liquid flow channels 522. Moreover, any number of additional components may be included within the CA-CCC 500, depending on the details of the specific implementation. For example, in some embodiments, the CA-CCC 500 includes an anti-swirl component that is attached to the upstream side of the CA-CCC 500.

Method for Purifying a Gas Stream using a Co-Axial Co-Current Contactor

Figure 6:
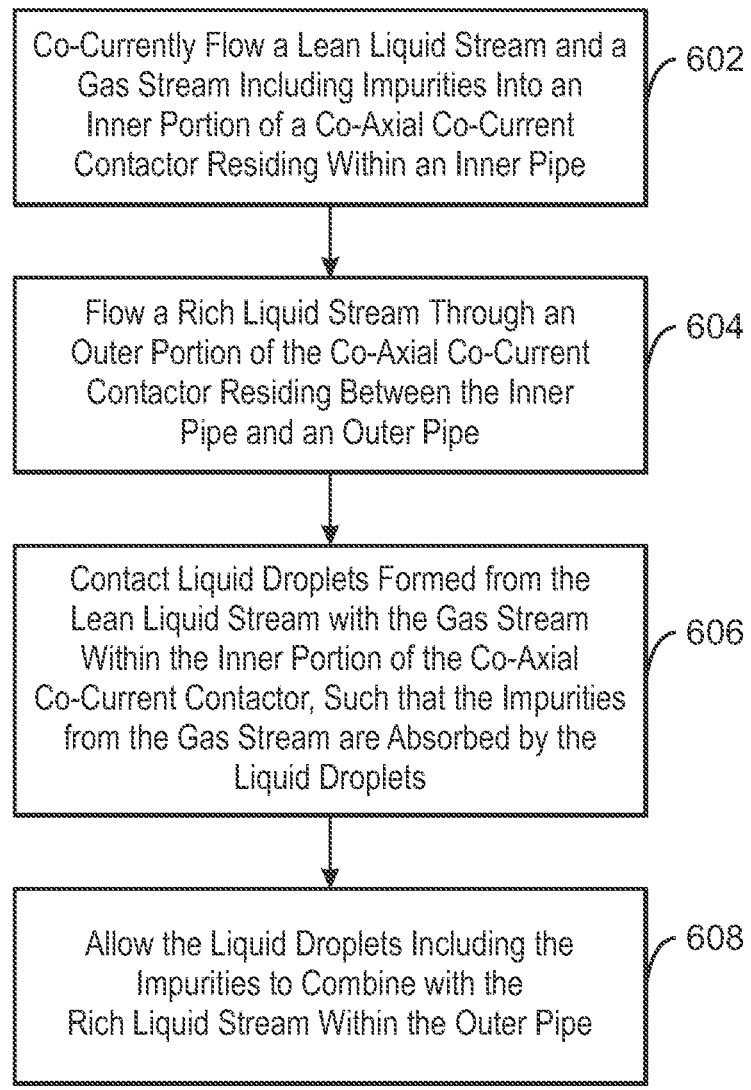
FIG. 6 is a process flow diagram showing a method for purifying a gas stream using a CA-CCC.

FIG. 6 is a process flow diagram showing a method 600 for purifying a gas stream using a CA-CCC. In various embodiments, the gas stream is a natural gas stream including impurities such as water or acid gases. The method 600 is implemented by a CA-CCC, such as the CA-CCC 500 of FIGS. 5A-E. In various embodiments, the CA-CCC is implemented within a CA-CCCS, such as the CA-CCCS 402 of FIGS. 4A-G. Further, the method 600 may be implemented by a gas purification system, such as the gas purification systems 400, 430, 432, 450, and 472 of FIGS. 4A-G.

The method begins at block 602, at which a lean liquid stream and a gas stream including impurities are co-currently flowed into an inner portion of the CA-CCC residing within an inner pipe. Specifically, the gas stream may be flowed into a central gas entry cone and a number of gas flow channels within the inner portion of the CA-CCC. The lean liquid stream may also be flowed into the central gas entry cone and the gas flow channels via a number of radial blades that secure the central gas entry cone within the inner portion of the CA-CCC.

At block 604, a rich liquid stream is flowed through an outer portion of the CA-CCC residing between the inner pipe and an outer pipe. Specifically, the rich liquid stream may be flowed through a number of rich liquid flow channels located between an outer annular support ring that secures the CA-CCC within the outer pipe and an inner annular support ring that secures the CA-CCC within the inner pipe.

In various embodiments, the inner annular support ring is attached to the outer annular support ring by a number of internal support structures. The internal support structures include channels that allow the lean liquid stream to flow from one or more lean liquid inlets on the outer annular support to ring to the inner annular support ring. From the inner annular support ring, the lean liquid stream then flows into the radial blades. A number of liquid injection orifices along the radial blades allow the lean liquid stream to be injected into the gas flow channels.

At block 606, liquid droplets formed from the lean liquid stream are contacted with the gas stream within the inner portion of the CA-CCC, such that the impurities from the gas stream are absorbed by the liquid droplets. At block 608, the liquid droplets including the impurities are allowed to combine with the rich liquid stream within the outer pipe.

The process flow diagram of FIG. 6 is not intended to indicate that the steps of the method 600 are to be executed in any particular order, or that all of the steps of the method 600 are to be included in every case. Further, any number of additional steps not shown in FIG. 6 may be included within the method 600, depending on the details of the specific implementation.

In various embodiments, the gas stream may be a treated gas stream received from an upstream system. For example, the gas stream may be a treated gas stream from an upstream CCC. In addition, in some embodiments, the gas stream may be flowed through a swirl element and an anti-swirl element before it enters the CA-CCC, as described with respect to the CA-CCCS 402 of FIGS. 4A-G.

Furthermore, in various embodiments, the rich liquid stream and the gas stream exiting the CA-CCC are flowed to a downstream system, which may be one of many options. For example, the rich liquid stream and the gas stream may be flowed through one or more additional CA-CCCSs, or one or more CCCSs. In addition, in some embodiments, the rich liquid stream and the gas stream are flowed into a separation system, which separates the rich liquid stream and the gas stream into two distinct streams. The rich liquid stream may then be sent to a regenerator. The regenerator may remove the impurities from the rich liquid stream, forming a regenerated liquid stream that may be flowed back into the CA-CCC as the lean liquid stream.

While embodiments described herein relate to the removal of impurities from a gas stream using the CA-CCC, it is to be understood that the CA-CCC may also be used for a variety of other applications. For example, in some embodiments, the CA-CCC is used for quench applications. For example, the CA-CCC may be used for the injection of cooling water or the direct injection of hot oil for ethylene quenching applications. In other embodiments, the CA-CCC is used for water wash applications, such as water wash applications including an acid gas absorber overhead stream. Further, in other embodiments, the CA-CCC is used for other mass transfer and/or heat transfer applications, such as a variety of fractionation applications.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A co-axial co-current contacting system (CA-CCCS), comprising:
an inner pipe and an outer pipe;
a swirl element secured within the outer pipe, wherein the swirl element is configured to cause a rich liquid stream to flow along a wall of the outer pipe and a gas stream comprising impurities to flow into an anti-swirl element secured within the inner pipe;
the anti-swirl element configured to straighten a flow of the gas stream; and
a co-axial co-current contactor (CA-CCC), comprising:
an inner portion residing within the inner pipe; and
an outer portion residing between the inner pipe and the outer pipe;
wherein the CA-CCC is configured to:
allow the rich liquid stream to flow through the outer portion;
allow a lean liquid stream and the gas stream to flow through the inner portion; and
contact liquid droplets formed from the lean liquid stream with the gas stream within the inner portion, such that the impurities from the gas stream are absorbed by the liquid droplets.

2. The CA-CCCS of claim 1, wherein the CA-CCCS is configured to allow the liquid droplets comprising the impurities to combine with the rich liquid stream within the outer pipe.

3. The CA-CCCS of claim 1, comprising:
an outer annular support ring configured to secure the CA-CCC within the outer pipe; and
an inner annular support ring configured to secure the CA-CCC within the inner pipe.

4. The CA-CCCS of claim 1, wherein the inner portion of the CA-CCC comprises:
a central gas entry cone and a plurality of gas flow channels configured to allow the gas stream to flow through the CA-CCC; and
a plurality of radial blades configured to:
secure the central gas entry cone within the inner pipe; and
allow the lean liquid stream to flow into the central gas entry cone and the plurality of gas flow channels.

5. The CA-CCCS of claim 1, wherein the outer portion of the CA-CCC comprises a plurality of rich liquid flow channels that are configured to allow the rich liquid stream to flow through the CA-CCC.

6. The CA-CCCS of claim 1, wherein the outer pipe and the inner pipe share a common axis.

7. A gas purification system, comprising:
a co-current contactor (CCC) configured to:
co-currently flow a gas stream comprising impurities and a first liquid stream through the CCC; and
incorporate first liquid droplets formed from the first liquid stream into the gas stream, such that a first portion of the impurities from the gas stream are absorbed by the first liquid droplets; and
a co-axial co-current contacting system (CA-CCCS), comprising:
an inner pipe and an outer pipe;
a swirl element secured within the outer pipe, wherein the swirl element is configured to cause the first liquid droplets to flow along a wall of the outer pipe and the gas stream to flow into an anti-swirl element secured within the inner pipe;
the anti-swirl element configured to straighten a flow of the gas stream; and
a co-axial co-current contactor (CA-CCC), comprising:
an inner portion residing within the inner pipe; and an outer portion residing between the inner pipe and the outer pipe;

wherein the CA-CCC is configured to:
allow the first liquid droplets to flow through the outer portion;
allow a second liquid stream and the gas stream to flow through the inner portion; and
contacting second liquid droplets formed from the second liquid stream with the gas stream within the inner portion, such that a second portion of the impurities from the gas stream are absorbed by the second liquid droplets.

8. The gas purification system of claim 7, comprising a separation system configured to remove the first liquid droplets and the second liquid droplets from the gas stream, forming a rich liquid stream and a purified gas stream.

9. The gas purification system of claim 8, wherein the gas purification system is configured to recycle the rich liquid stream into the CCC as the first liquid stream.

10. The gas purification system of claim 8, comprising a regenerator configured to regenerate the first liquid stream and the second liquid stream from the rich liquid stream.

11. The gas purification system of claim 7, comprising a plurality of CA-CCCSs connected within the outer pipe, wherein any of the plurality of CA-CCCSs is configured to recycle a corresponding liquid stream to an upstream one of the plurality of CA-CCCs.

12. The gas purification system of claim 7, comprising a co-current contacting system (CCCS) positioned either upstream or downstream of the CA-CCCS within the outer pipe, wherein a liquid stream exiting the CCCS is recycled into the CCC as the first liquid stream.

\* \* \* \* \*